(12) United States Patent
Nakajima et al.

(10) Patent No.: US 7,558,225 B2
(45) Date of Patent: Jul. 7, 2009

(54) RADIO COMMUNICATION SYSTEM

(75) Inventors: Tetsu Nakajima, Yokohama (JP);
Tomoko Adachi, Urayasu (JP);
Masahiro Takagi, Tokyo (JP); Tomoya Tandai, Tokyo (JP); Yoriko Utsunomiya, Tokyo (JP); Yasuyuki Nishibayashi, Kawasaki (JP); Kiyoshi Toshimitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 480 days.

(21) Appl. No.: 11/385,662

(22) Filed: Mar. 22, 2006

(65) Prior Publication Data

US 2006/0221879 A1   Oct. 5, 2006

(30) Foreign Application Priority Data

Mar. 31, 2005   (JP) ............... 2005-103922

(51) Int. Cl.
*H04L 12/56* (2006.01)
*H04L 12/413* (2006.01)
*H04W 72/00* (2009.01)

(52) U.S. Cl. ............ 370/310; 370/395.4; 370/447; 455/450

(58) Field of Classification Search ......... 370/346–348, 370/395.2, 395.43, 410, 431, 461–462, 468, 370/445–449; 455/450–453
See application file for complete search history.

(56) References Cited

U.S. PATENT DOCUMENTS

2005/0165946 A1 * 7/2005 Stephens ............... 709/233

2005/0221832 A1 * 10/2005 Nakayasu ............... 455/445

FOREIGN PATENT DOCUMENTS

JP   2005-12725   1/2005

OTHER PUBLICATIONS

Aon et al., "7.1.10 Bi-directional data transfer" and "9.1.5 Selecting RDL/RDG Values", TGn Sync Proposal Technical Specification, IEEE 802.11-04/0889r44, Mar. 2005, pp. 54-56 and pp. 78-79.
U.S. Appl. No. 11/744,253, filed May 4, 2007, Nakajima, et al.
U.S. Appl. No. 11/847,852, filed Aug. 30, 2007, Nakajima, et al.

* cited by examiner

*Primary Examiner*—Alexander Eisen
*Assistant Examiner*—Michael T Thier
(74) *Attorney, Agent, or Firm*—Oblon, Spivak, McClelland, Maier & Neustadt, P.C.

(57) ABSTRACT

A radio base station apparatus used in a radio communication system in which an initiator holds a transmission opportunity (TXOP) period in a frame exchange sequence and a responder responds to the initiator in the frame exchange sequence is disclosed. The apparatus includes a setting device which sets a ratio between a first period necessary for transmitting a first frame from the initiator to the responder and a second period necessary for transmitting a second frame from the responder to the initiator. The apparatus also includes a calculation device which calculates the first period to be used by the initiator and the second period to be used by the responder, on the basis of the transmission opportunity period and of the ratio which is set.

23 Claims, 6 Drawing Sheets

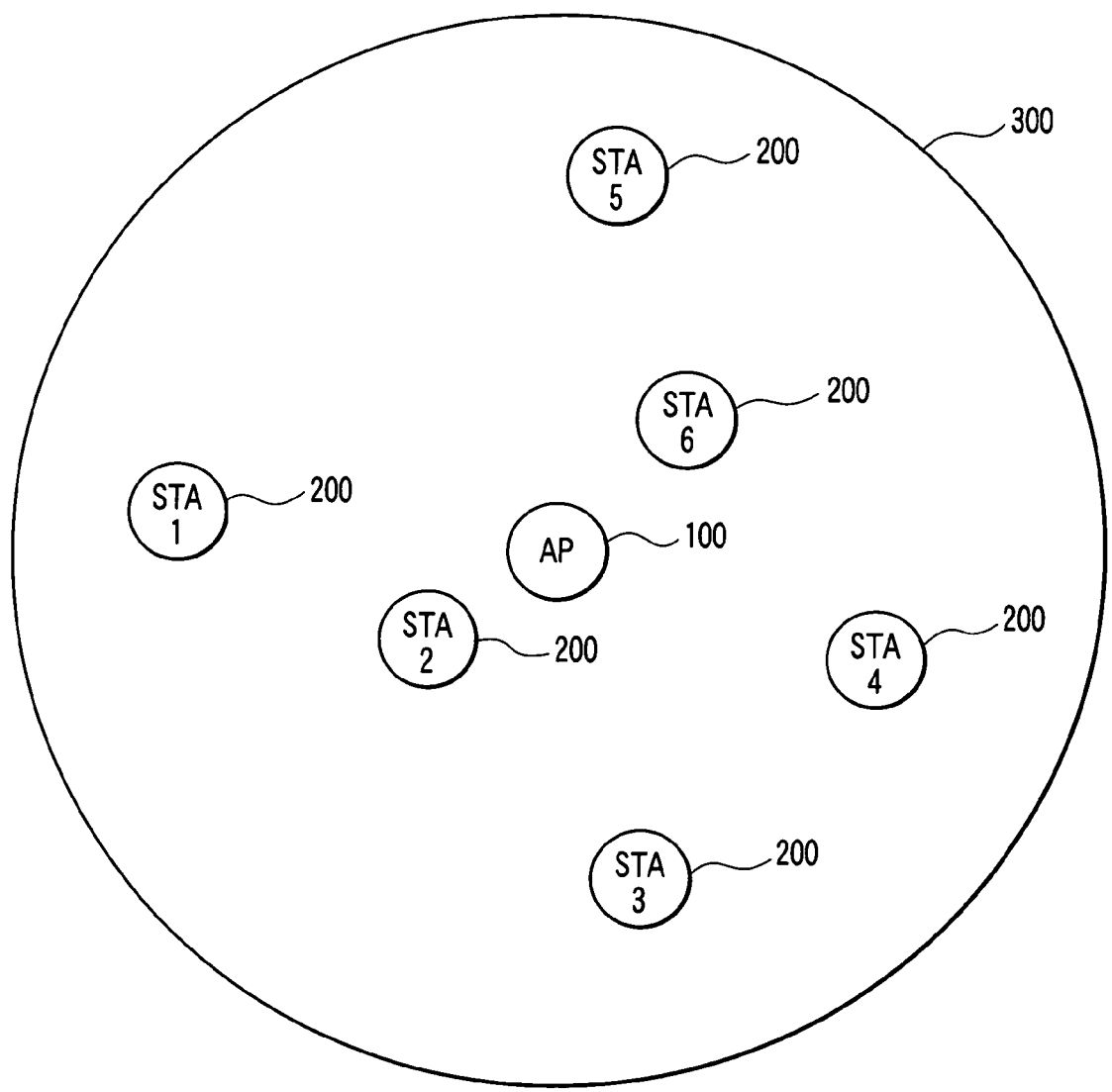
F I G. 1

|  | AC_VO | AC_VI | AC_BE | AC_BK |
|---|---|---|---|---|
| CWmin | (aCWmin+1)/4-1 | (aCWmin+1)/2-1 | aCWmin | aCWmin |
| CWmax | (aCWmax+1)/2-1 | aCWmin | aCWmax | aCWmax |
| AIFSN | 2 | 2 | 3 | 7 |
| TXOP Limit | 3ms | 6ms | 0 | 0 |
| ACM bit | 1 | 1 | 0 | 0 |
| Bidirectional ratio | 0.5 | 0.25 | - | - |
F I G. 1 0
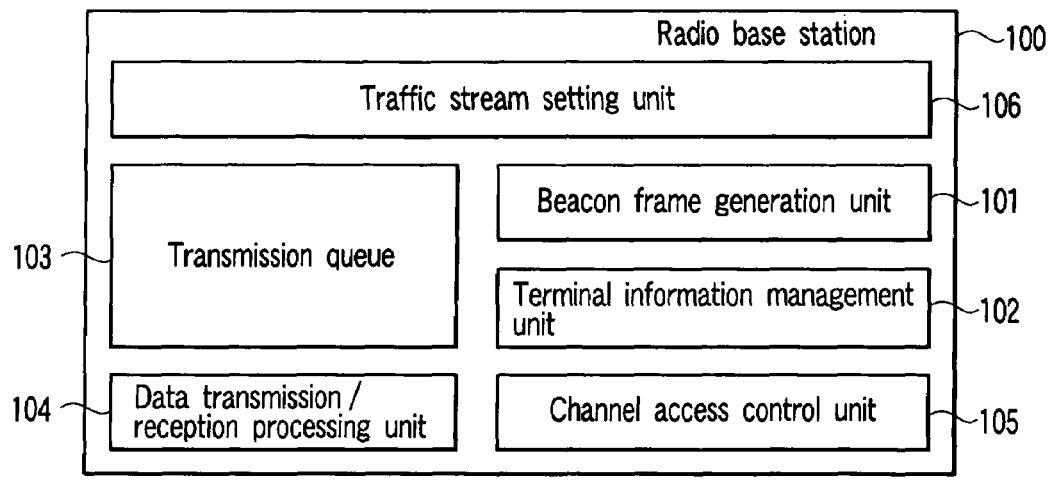
F I G. 1 1
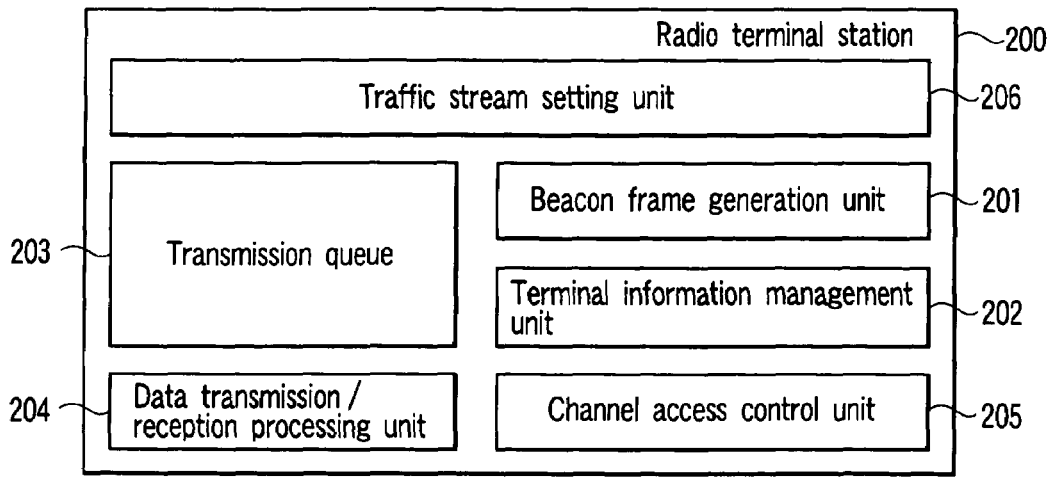
F I G. 1 2

RADIO COMMUNICATION SYSTEM

CROSS-REFERENCE TO RELATED APPLICATIONS

This application is based upon and claims the benefit of priority from prior Japanese Patent Application No. 2005-103922, filed Mar. 31, 2005, the entire contents of which are incorporated herein by reference.

BACKGROUND OF THE INVENTION

1. Field of the Invention

The present invention relates to a radio base station apparatus, a radio terminal apparatus, a radio communication system, a band assignment method and a program capable of providing a part of a period regarding a data transmission right which has been acquired by an initiator to a responder.

2. Description of the Related Art

The quality of service (QoS)-expanded wireless LAN standard IEEE 802.11e includes two types of access control methods: an enhanced distributed channel access method (EDCA); and an HCF controlled channel access (HCCA) method. When a wireless LAN terminal acquires a transmission opportunity (TXOP) period in which a wireless LAN terminal can transmit a plurality of items of data by using either of the two types of access control method, the wireless LAN terminal which has acquired the TXOP period can perform data transmission during the TXOP period in accordance with the IEEE 802.11e standard (refer to IEEE 802.13e Draft 13.0, IEEE P 802.11e/Draft 13.0, January 2005).

On the other hand, IEEE 802.11n intending to a high-rate transmission presents a bi-directional data transfer method capable of enhancing a transmission efficiency in a manner that the wireless LAN terminal which has acquired the TXOP period provides a part thereof to a responder for the data so as to perform a bi-directional communication by a piggyback method during the same TXOP period.

IEEE 802.11n differs from other existing IEEE 802.11 standard, prepares an Aggregation frame in which a plurality of items of data collected (i.e., aggregated) into one data frame then transmits the Aggregation frame as the one data frame so as to reduce overheads which have existed among each data frame (when not aggregated).

When acquiring the TXOP period for an Aggregation frame transmission in the EDCA method, an IAC-RAC frame exchange is performed, wherein an initiator transmits an initiator aggregation control (IAC) frame then the responder replies a responder aggregation control (RAC) frame after its short inter-face space (SIFS).

In the bi-directional data transfer, at the IAC-RAC frame exchange, the responder for the data writes the number of data frames which can be transmitted when the part of the TXOP period has been provided and a transmission data rate into the RAC frame to inform them. The initiator determines, from the value which has been described in the RAC frame, the part of the TXOP period to be distributed after transmitting the Aggregation frame. Hereinafter, this period is referred to as a reverse direction grant (RDG) Duration. The initiator writes the determined RDG Duration into the IAC frame to add it on the head of the Aggregation frame and transmits it after the SIFS from the reception of the Aggregation frame. The responder which has received the Aggregation frame has to notify a reception situation resulting from a Block Ack (acknowledgement) frame after the SIFS from the reception of the Aggregation frame from the initiator. In the use of the bi-directional data transfer method, when the Block Ack frame is replied after the SIFS, the data from the responder is transmitted together with the Block Ack by using the piggyback method which aggregates some data frames with the Block Ack frame to transmit them. At this time, the transmission time period of the Aggregation frame in which some data frames are aggregated in the Block Ack frame is not allowed to exceed the time period of the RDG Duration written in the IAC frame.

In this way, the initiator can distribute the part of the TXOP period acquired by the initiator to the responder.

When the responder transmits the Aggregation frame in the piggyback method, if the responder further requires the RDG Duration, it may further require the RDG Duration by inseting the number of data frames and the transmission data rate to the RAC frame and adding them to the head of the Aggregation frame to reply them (Refer to TGn Sync. Proposal Technical Specification, IEEE 802.11-04/889r1, November 2004).

However, the aforementioned conventional technique determines a value of the RDG Duration to be assigned to the responder by referring to the value written in the RAC frame notified just before, so that the conventional technique leaves a situation of a traffic stream (hereinafter referred to as a TS) which has been set between a radio terminal station and a radio base station and a situation of radio environment out of consideration. Accordingly, if required values from the responder are large and all required values are reflected to the RDG Duration, it is presented as a problem, such that the transmission period to satisfy the requirement of the TS of the initiator is employed to the data transmission from the responder and the requirement of the set TS cannot be satisfied.

Since the conventional technique transmits the Aggregation frame with the RDG Duration after the SIFS from the RAC frame reception, the conventional technique has to calculate the value of the RDG Duration in an extremely short time. Therefore, the conventional technique has to design a wireless LAN baseband LSI by means of hardware with a high operation speed. It is hard for the design by means of the hardware to perform a complicated calculation, and the design presents a variety of problems such that failures occurs frequently in its development and modifications are hard after the development.

BRIEF SUMMARY OF THE INVENTION

One aspect of the present invention is directed to a radio base station apparatus used in a radio communication system in which an initiator holds a transmission opportunity (TXOP) period in a frame exchange sequence and a responder responds to the initiator in the frame exchange sequence. The apparatus includes a setting device which sets a ratio between a first period necessary for transmitting a first frame from the initiator to the responder and a second period necessary for transmitting a second frame from the responder to the initiator. The apparatus also includes a calculation device which calculates the first period to be used by the initiator and the second period to be used by the responder, on the basis of the transmission opportunity period and of the ratio which is set.

BRIEF DESCRIPTION OF THE SEVERAL VIEWS OF THE DRAWING

FIG. 1 is an exemplary view showing a configuration example of a terminal arrangement in a radio communication system where radio communication apparatuses regarding the present invention are arranged;

FIG. 10 is an exemplary view showing an example of EDCA parameter sets for use in a second embodiment of the present invention;

FIG. 11 is an exemplary view showing a configuration example of an AP regarding the second embodiment of the present invention;

FIG. 12 is an exemplary view showing a configuration embodiment of a STA regarding the second embodiment of the present invention;

DETAILED DESCRIPTION OF THE INVENTION

Figure 2:
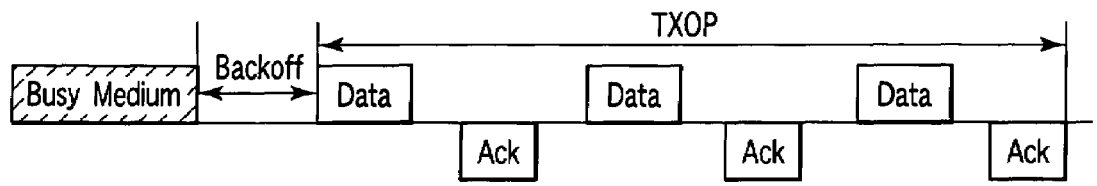
FIG. 2 is an exemplary view showing an example of a data transmitting/receiving method in an EDCA method of IEEE 802.11e.

Hereinafter, embodiments of the present invention will be described with reference to the drawings.

An embodiment of the present invention will be described as an example by referring to a content proposed in the IEEE 802.11n standard intending to a high-speed transmission of a wireless LAN communication standard to be a communication method in a radio communication system. The content proposed in IEEE 802.11n described herein includes the entire IEEE 802.11 standard and the modified IEEE 802.11e standard with QoS for wireless LAN medium access control (MAC) expanded therein and also includes the amendment of the IEEE 802.11 standard and the standard ranked as recommended practices.

A high-speed LAN communication according to IEEE 802.11n described in the embodiments of the present invention is seemed as a radio communication method to which the present invention can be adopted. The present invention is not limited to IEEE 802.11n and to the wireless LAN communication and applicable to a whole of radio communication methods and a whole of radio communication equipment such as a cellar phone and a wireless LAN.

This embodiment will be described, by way of example of below-mentioned bi-directional data transfer method proposed in IEEE 802.11n and by way of example in the case of adaptation of the present invention to 'determination method of RDG Duration length at assigning RDG Duration to STA in bi-directional data transfer' as 'radio communication system in which data is transmitted/received wirelessly, an initiator can perform a burst transmission of a plurality of items of transmission data for an acquired period by acquiring a transmission right of the data and also can distribute a part of the acquired period to an responder'.

In a first embodiment, a basic configuration will be described, and in second to ninth embodiments, a calculation method of a ratio ξ to be described in the first embodiment will be mentioned in detail by dividing the calculation method into EDCA methods (second to fourth embodiments) being self distribution procedures by carrier sense multiple access with collision avoidance (CSMA/CA) and into HCCA methods (fifth to ninth embodiments) being collective control procedures using polling. A part relating to the EDCA method and a part relating to the HCCA method in the present invention may become effective independently of each other. Regarding the part related to the HCCA, the present invention may adapt only to the AP, and the STA may be configured in the same configuration as that of the conventional one. The present invention may put into practice the part relating the EDCA method in both AP and STA.

In a tenth embodiment, an example of a configuration to divide transmission queues of radio communication apparatuses (AP and STA) in the fourth, seventh, eighth and ninth embodiments into two of normal transmission queues and transmission queues for TCP-Ack will be explained. The TCP-Ack is originally a transmission acknowledgement frame in TCP; however the present invention may use a protocol, other than TCP as a transmission acknowledgement frame in a layer with an order higher than that of an MCA layer without having to limit to TCP.

FIRST EMBODIMENT

Hereinafter, a first embodiment of the present invention will be described.

FIG. 1 shows the configuration example of the terminal arrangement in the radio communication system where the radio communication apparatuses (AP and STA) regarding the present invention are arranged.

In FIG. 1 the communication system includes an AP 100 and STAs 200. FIG. 1 shows a specific example in the case of a communication form by which six sets of STAs STA1-STA6 are connected wirelessly with one another in a radio cell [hereinafter referred to as basic service set (BSS)] 300 to be managed by the AP 100.

In IEEE 802.11, a configuration unit of a BSS composed of one AP and more than one STA belonging to the AP is referred to as a BSS. In the first embodiment, the BSS 300 to be managed by the AP 100 will be described as an example; however the present invention will be possible to be adopted even to the case, instead of the configuration shown in FIG. 1, of a configuration of an ad hoc communication where there is no AP and, for example, not less than two STAs having the same communication ability make radio communications. In IEEE 802.11, a unit of the ad hoc communication consisting only of the STA without any AP is referred to as independent basic service set (IBSS).

Frame exchange by which the AP 100 and the STAs STA1-STA6 make communications with one another includes frames, for example in IEEE 802.11, a management frame for use in management among terminals or the BSS 300 in a MAC layer level and a control frame to control in exchange of a data frame generated from a payload (for example, either frame, etc.) and transferred from a higher order logical link control (LLC) layer to the MAC layer or the management frame, other than the data frame.

The BSS in IEEE 802.11 inserts parameters, time information and the like to be used in the BSS 300 to a Beacon frame being the management frame periodically transmitted from the AP 100 to transmit them. And each STA 200 in the BSS 300 extracts the parameters to be used in the BSS 300 from the received Beacon frame then notifies widely a variety of parameters for use in the BSS 300. The STA 200 performs authentication processing by performing authentication processing by Association frame exchange and performing Association processing by the Association frame exchange with the AP 100, and then the STA 200 belongs to the BSS 300.

In IEEE 802.11e, after belonging to the BSS 300, if the Block Ack, traffic stream (TS), inter-terminal communication (DLS), etc., are brought into use, each STA 200 becomes available by exchanging the management frame with the AP to negotiate with the Block Ack, the TS, the DLS, etc.

An access control method so that each of the STAs 200 and the AP 100 perform the data transmission includes an EDCA and an HCCA. The EDCA is a self distribution procedure and the HCCA is a collective control procedure using polling.

Both EDCA and HCCA methods introduce concepts of a TXOP so as to reduce overhead resulted from back-off and poll frame transmissions and to continuously transmit data. The concept of the TXOP obtains a transmission right of a TXOP period in which each STA 200 or the AP 100 allows to continuously transmit the data, when the STA 200 or the AP 100 obtaining the transmission right of the data by back-off processing or a poll frame reception. The STA 200 or the AP 100 which has obtained the transmission right of the TXOP period does not perform collision avoiding processing but performs transmission processing of the data by spacing a short inter-frame spacing (SIFS), during the TXOP period.

Hereinafter, examples of the data transmitting/receiving methods in the EDCA method, in the HCCA method and in the Block Ack method will be explained by referring to FIG. 2-FIG. 4, respectively. Here, parts respectively sandwiched between a data frame (hereinafter, data frame is referred to as Data), a transmission acknowledgement frame (hereinafter, transmission acknowledgement frame is referred to as Ack), Block Ack and Block Ack Request in FIG. 2 and FIG. 3 and parts between a reception of QoS Cf-Poll frame and a transmission of Data are respectively equivalent to the SIFS intervals. Data functions as a data frame, Ack, Block Ack and Block Ack Request each function as a control frame to be used for a transmission acknowledgement of each data frame. Those detailed contents are described in each standard of the wireless LAN.

FIG. 2 shows the example of the data transmitting/receiving method in the EDCA method of IEEE 802.11e.

The TXOP in the EDCA method is, as shown in FIG. 2, the period in which the STA 200 or the AP 100 which has obtained the transmission right capable of performing the data transmission with the SIFS interval during the prescribed TXOP period after obtaining the transmission right resulting from Back-off completion by the CSMA/CA. The prescribed TXOP period has become widely known in the BSS 300 by means of the Beacon frame.

Figure 3:
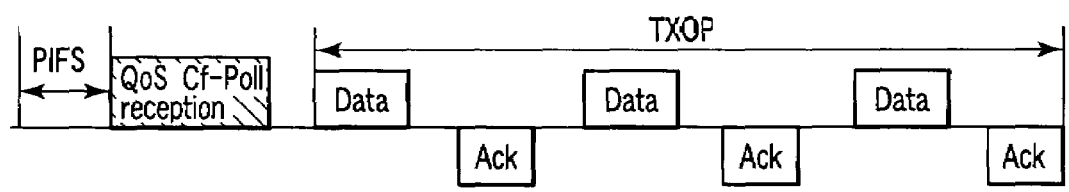
FIG. 3 is an exemplary view showing an example of a data transmitting/receiving method in an HCCA method of IEEE 802.11e.

FIG. 3 shows the example of the data transmitting/receiving method in the HCCA method of the IEEE 802.11e.

In the HCCA method, as shown in FIG. 3, the STA 200 obtains the transmission right by receiving a poll frame (QoS Cf-Poll frame) from the AP 100 instead of carrying out the back-off processing and can transmit the data during the TXOP period indicated by the poll frame. In the case of a transmission of the data from the AP 100 to the STA 200, the AP 100 carries out carrier sense in a radio space instead of an obtaining method of the transmission right by means of the poll frame and assumes of obtaining of the transmission right depending on the confirmation that the radio space in a polling inter-frame space (PIFS) period is an Idle state and performs a data transmission.

Figure 4:
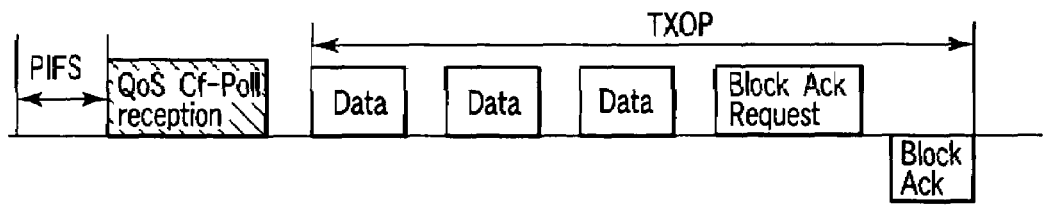
FIG. 4 is an exemplary view showing an example of a data transmitting/receiving method in Block Ack method of IEEE 802.11e.

FIG. 4 shows the example of the data transmitting/receiving method in the Block Ack method of the IEEE 802.11e.

FIG. 4 shows the Block Ack method for enabling highly efficient transmission processing of each transmission acknowledgment frame (Ack) to each data frame (Data) by collectively replying the Acks. As shown in FIG. 4, the Block Ack method transmits Data with SIFS intervals after obtaining the TXOP period and transmits the Block Ack Request frame being a transmission acknowledgement request for the last time. Upon the reception of the Block Ack Request frame, the responder replies a transmission acknowledgement situation as the Block Ack frame. The TXOP period in the Block Ack method may be obtained by both EDCA and HCCA methods, it is not necessarily for the Block Ack frame to be received during the TXOP period. However, the obtaining of the TXOP period in the EDCA method to perform the data transmission in the Block Ack method causes the data to be transmitted at the SIFS intervals after the frame exchange by the CTS frame after obtaining the TXOP period.

Hereinafter, the cases of use of the Frame aggregation method and the bi-directional data transfer method proposed in IEEE 802.11n will be described, as an example. The present invention is adaptable even to the case of the use of the bi-directional data transfer without suing the Frame aggregation method.

The Frame aggregation method is a method for further reducing the SIFS intervals existed in the Block Ack method to transmit the Data frame by getting together into one transmission frame (Aggregation frame).

The bi-directional data transfer method is a method expanded for the TXOP in IEEE 802.11e. In the IEEE 802.11e, a terminal which has obtained the transmission right carries out the data transmission for the TXOP period and the others cannot carry out the data transmissions until the obtained TXOP will be ended or released. However, the bi-directional data transfer method is a method by which the terminal which has obtained the transmission right performs a bi-directional data communication during the same TXOP period by distributing a part of the TXOP period to the responder.

Here, the bi-directional data transfer method proposed in IEEE 802.11n will be firstly described in detail.

Figure 5:
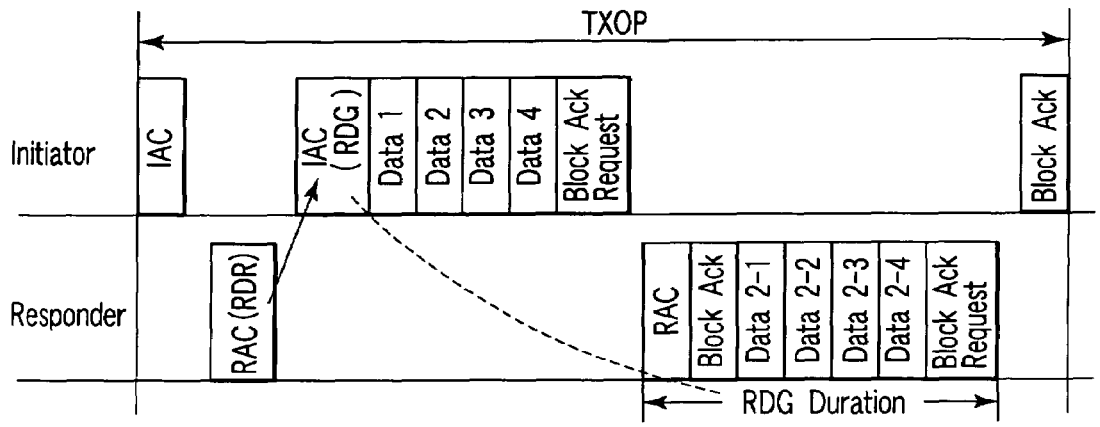
FIG. 5 is an exemplary view showing an example of a bi-directional data transfer method proposed by IEEE 802.11n.

FIG. 5 shows the example of the bi-directional data transfer proposed in IEEE 802.11n.

In the bi-directional data transfer method, a initiator transmits the IAC frame in order to obtain the TXOP. The IAC frame describes information, showing whether or not the bi-directional data transfer method is brought into use, therein.

The responder transmits the RAC frame being a response frame to the IAC frame; however if information showing the fact of the use of the bi-directional data transfer method has been described in the IAC frame, the responder describes a length (byte length) resulting from a total of the whole data desired to be transmitted and a transmission rate when a part of the TXOP has been distributed and notifies them.

After receiving the RAC frame transmitted form the responder, the initiator determines an RDG Duration length to assign it to the responder in accordance with a required value from the responder described in the RAC frame. The initiator describes the determined RDG Duration length in the IAC frame and prepares an Aggregation frame in which the IAC frame, transmission data (Data 1, Data 2, Data 3 and Data 4 in example in FIG. 5) and a Block Ack Request frame are collected into one to transfer it.

When transmitting the Block Ack frame as transmission acknowledgement for the transmission data (Data 1, Data 2, Data 3 and Data 4) from the initiator, the responder prepares an Aggregation frame in which the Block Ack frame, the transmission data (Data 2-1, Data 2-2, Data 2-3 and Data 2-4 in example in FIG. 5) addressed to the initiator and the Block Ack Request within a range not exceeding the RDG Duration length in the IAC frame included in the Aggregation frame are collected into one. The Aggregation frame prepared by the responder adjusts the number of the data to be aggregated so as not to exceed the RDG Duration length. The responder replies the prepared Aggregation frame after the elapse of the SIFS interval from the completion of the reception of the Aggregation frame transmitted from the initiator.

After that, if the initiator does not continue the data transmission, it replies the Block Ack frame to terminate its data transmission as shown in FIG. 5. If the remaining of the TXOP is sill exists and the initiator still continues the data transmission, it repeats the same sequence to perform the bi-directional data communication.

Having described the example of the use of the Block Ack Request frame in the aforementioned example, an Implicit Block Ack method (proposed in IEEE 802.11n) may be used, wherein the Implicit Block Ack method eliminates the Block Ack Request to be a transmission request for a transmission acknowledgement by carrying out the transmission acknowledgement through the Block Ack frame on the basis of the fact of the transmission of the Aggregation frame as a trigger.

Next to this, a configuration example of the radio communication apparatus in this first embodiment will be described.

Figure 6:
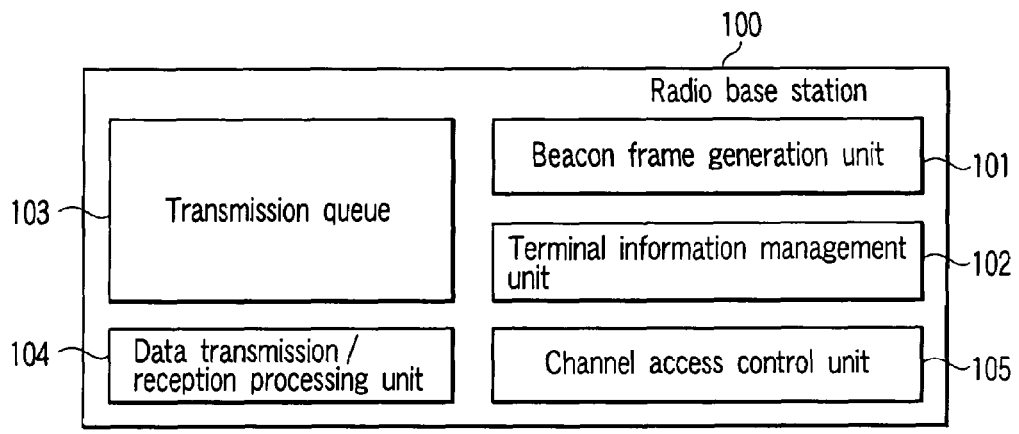
FIG. 6 is an exemplary view showing a configuration example of a radio base station (hereinafter referred to as an AP) regarding a first embodiment of the present invention.

FIG. 6 shows the configuration of the AP 100 of the first embodiment.

The AP 100 in the first embodiment includes, as shown in FIG. 6, a Beacon frame generation unit 101, a terminal information management unit 102, a transmission queue 103, a data transmission/reception processing unit 104 and a channel access control unit 105.

The Beacon frame generation unit 101 stores a parameter to use in the BSS 300 to generate a Beacon frame by using the stored parameter at a transmission time of the Beacon frame.

The terminal information management unit 102 manages information of the STA 200 belonging to the BSS 300 to be managed by self apparatus (corresponding AP 100), such as information about the STA 200 which has been in association with the AP 100 and information in negotiating with the AP 100 for the TS and information in setting-up for the Block Ack, inter-terminal communication.

The transmission queue 103 performs buffering of the transmission data.

The data transmission/reception processing unit 104 conducts processing necessary for a data transmission/reception.

The channel access control unit 105 observes the radio channel and conducts the back-off to obtain the transmission right in the data transmission/reception.

Figure 7:
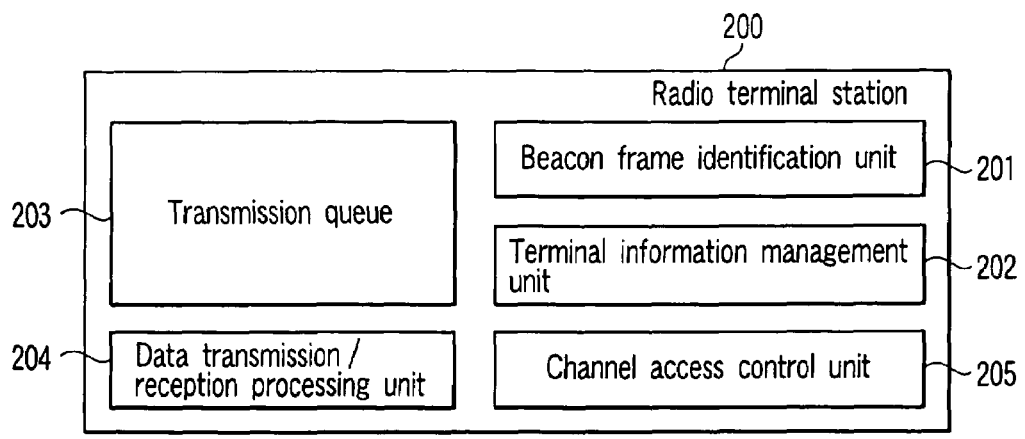
FIG. 7 is an exemplary view showing a configuration example of a radio terminal station (hereinafter referred to as an STA) regarding the first embodiment of the present invention.

FIG. 7 shows a configuration of an STA 200 in the first embodiment.

The STA 200 comprises, as shown in FIG. 7, a Beacon frame identification unit 201, a terminal information management unit 202, a transmission queue 203, a data transmission/reception processing unit 204 and a channel access control unit 205.

The Beacon frame identification unit 201 takes out information in the BSS 300 described in the Beacon frame received from the AP 100 to store its information in the identification unit 201.

The terminal information management unit 202 manages information, having to be managed by self apparatus (STA 200), such as information in association with the AP 100 and information in negotiating with the AP 100 for the TS and information in setting-up for the Block Ack, inter-terminal communication.

The transmission queue 203 buffers the transmission data.

The data transmission/reception processing unit 204 performs processing necessary for the data transmission/reception.

The channel access control unit 205 observes the radio channel and conducts the back-off to obtain the transmission right in the data transmission/reception.

The first embodiment sets a parameter to 'ratio $\xi$' to be used in a calculation for assigning the RDG Duration to the responder in adopting the bi-directional data transfer to this embodiment. Here, if the $\xi$ is a specific value (for example, zero), it is assumed that the $\xi$ represents no use of the bi-directional data transfer method. A specific example of a calculation method of this ratio $\xi$ will be described in a second to a ninth embodiments.

The ratio $\xi$ is calculated in the AP 100 (terminal information management unit 102 in configuration example in FIG. 6), by using, for example, the calculation method which will be described in the second to ninth embodiments and stored in the data transmission/reception processing unit 104 so as to be used in communication by the bi-directional data transfer method.

The AP 100 reads out the ratio $\xi$ stored in the data transmission/reception processing unit 104 at the time of the Beacon transmission so as to notify it to each STA 200 and the Beacon frame generation unit 201 describes the ratio $\xi$ into the Beacon frame, and then transmits the Beacon frame. Each STA 200 with the Beacon frame received thereby reads out the ratio $\xi$ from the Beacon frame by means of a Beacon frame identification unit 201 to store it in the data transmission/reception processing unit 204 in the STA 200 in the same way as that of the AP 100. The AP 100 and each STA 200 can each calculate the RDG Duration on the basis of the values of the TXOP length and the ratio $\xi$.

If the STA 200 does not determine the RDG Duration length on the basis of the ratio $\xi$, it may be eliminated to notify the ratio $\xi$ to each STA 200 from the AP 100.

Hereinafter, a determination method of the RDG Duration by the use of the ratio $\xi$ in the first embodiment will be explained in detail.

Figure 8:
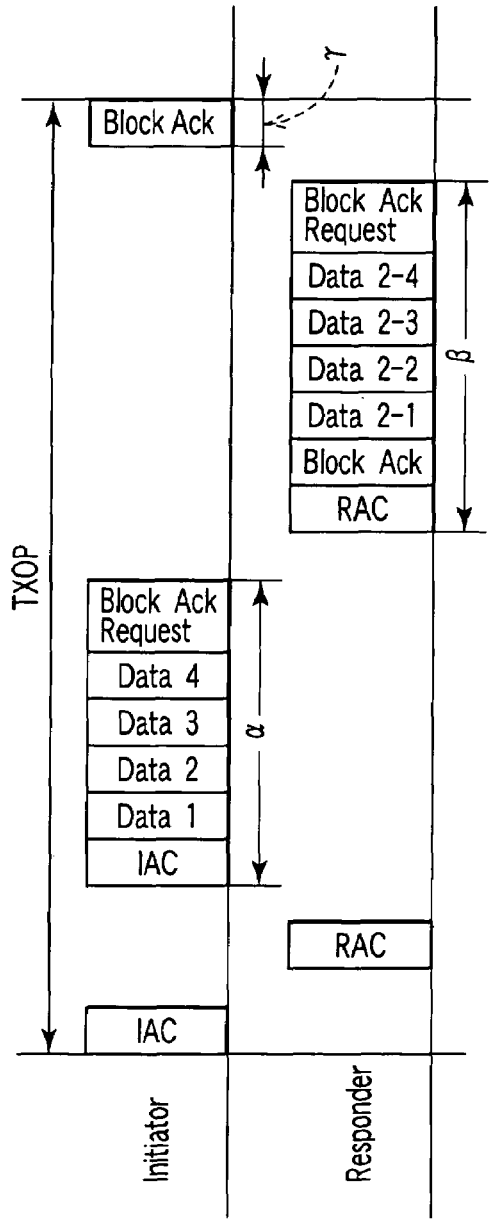
FIG. 8 is an exemplary view showing an operation example in a communication method during a TXOP period in the bi-directional data transfer method proposed in IEEE 802.11n.

FIG. 8 shows the operation example of the communication method during the TXOP period in the bi-directional data transfer in the first embodiment.

When the STA 200 or the AP 100 conducts the data transmission, the channel access control unit (105 or 205) obtains the data transmission right of the TXOP period in the EDCA method or the HCCA method. The STA 200 or the AP 100 which has obtained the transmission right of the TXOP period exchanges the IAC frame for the RAC frame as shown in FIG. 8. After the exchange of the IAC frame and the RAC frame, the data transmission/reception processing unit (104 or 204) of the initiator takes out a plurality of items of the transmission data from the transmission queue (103 or 203) to prepare the Aggregation frame. At this moment, the data transmission/reception processing unit (104 or 204) determines an Aggregation frame length (a) to be transmitted and an RDG Duration length ( ) to be given to the reception terminal, by using the obtained TXOP length and the ratio ξ to write in the RDG Duration into the IAC frame in the Aggregation frame and prepares the Aggregation frame by aggregating a plurality of items of data.

Some examples of the calculation methods of the ratio ξ (definition formula of ratio ξ) will be shown below.

$\xi=\beta/\alpha$ $\xi=\beta/(TXOP \text{ length})$ $\xi=(\beta+RAC \text{ frame length})/(TXOP \text{ length})$ $\xi=\beta/(\alpha+\gamma)$ $\xi=\beta/(\alpha+SIFS)$ $\xi=\beta/(\alpha+SIFS\times2+\gamma)$ $\xi=\beta/(\alpha+SIFS\times2)$ $\xi=(RAC \text{ frame length}+\beta)/(IAC \text{ frame length}+\alpha)$ The following calculation methods satisfying the reciprocal relationships with each foregoing ξ may be used.

$\xi=\alpha/\beta$ $\xi=(TXOP \text{ length})/\beta$ $\xi=(TXOP \text{ length})/(\beta+RAC \text{ frame length})$ $\xi=(\alpha+\gamma)/\beta$ $\xi=(\alpha+SIFS)/\beta$ $\xi=(\alpha+SIFS\times2+\gamma)/\beta$ $\xi=(\alpha+SIFS\times2)/\beta$ $\xi=(IAC \text{ frame length}+\alpha)/(RAC \text{ frame length}+\beta)$ A variety of calculation methods may be taken into consideration other than the aforementioned example.

The initiator determines the Aggregation frame length (α) to be transmitted and the RDG Duration length (β) to be provided to the responder on the basis of the values of the TXOP length and the ratio ξ and the definition formula of the ratio ξ and makes communications in the bi-directional data transfer.

Having shown the example of the exchange of the IAC frame for the RAC frame at the beginning of the TXOP in FIG. 8, it is not necessary to exchange the IAC frame for the RCA frame and the Aggregation frame may be transmitted at the beginning of the TXOP.

FIG. 8 shows the example in the case of the transmission of frames of the Aggregation frame one by one from the initiator and the responders; however hereinafter, the case of transmission of a plurality of frames of the Aggregation frame during one TXOP period will be mentioned.

Figure 9:
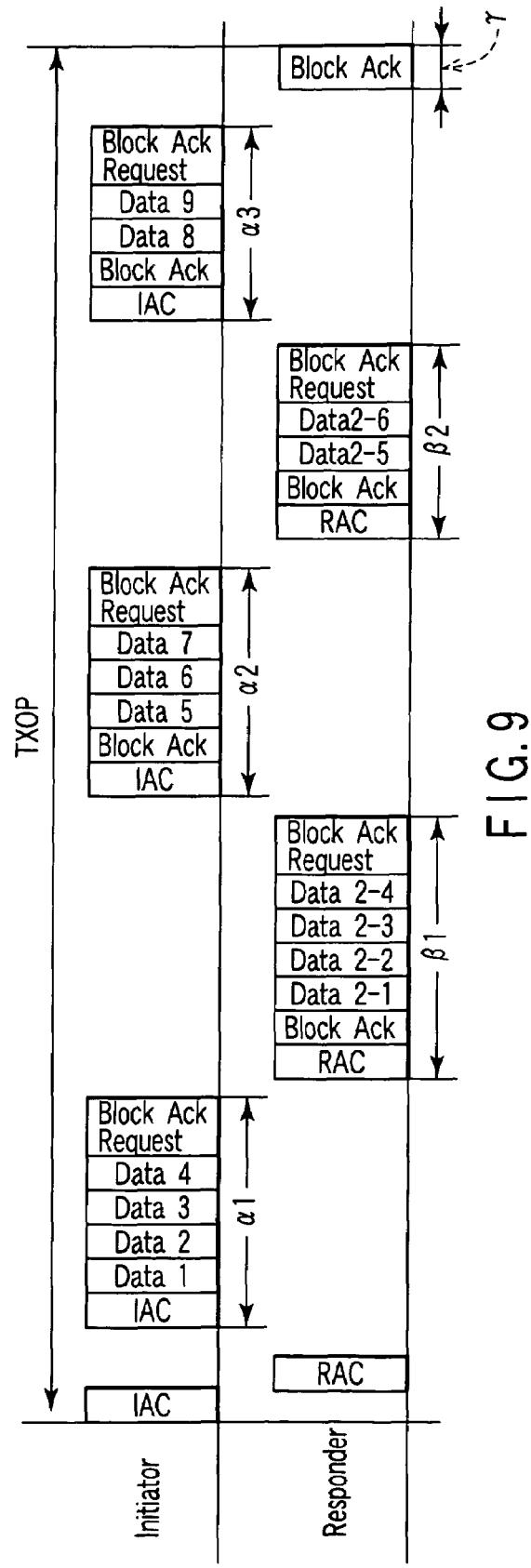
FIG. 9 is an exemplary view showing another operation example in the communication method during the TXOP period in the bi-directional data transfer method proposed in IEEE 802.11n.

FIG. 9 shows an operation example of a communication method during the TXOP period in the bi-directional data transfer in the case of the transmission of a plurality of frames of the Aggregation frame during one TXOP period in the first embodiment.

Some examples of calculation methods (definition formula of ratio ξ) for determining an Aggregation frame length (α) to be transmitted and an RDG Duration length (β) to be provided to the responder by the use of the obtained TXOP length and ratio ξ when the plurality of frames of the Aggregation frame are transmitted from both an initiator and responder during one TXOP period will be shown as follows.

$\xi=\beta1/\alpha1=\beta2/\alpha2$ $\xi=(\beta1+SIFS)/(\alpha1+SIFS)=(\beta2+SIFS)/(\alpha2+SIFS)$ $\xi=(\beta1+\beta2)/(TXOP \text{ length})$ $\xi=(\beta1+\beta2+RAC \text{ frame length})/(TXOP \text{ length})$ $\xi=(\beta1+\beta2+\gamma)(TXOP \text{ length})$ $\xi=(\beta1+\beta2+\gamma+RAC \text{ frame length})/(TXOP \text{ length})$ $(\beta1+\beta2)/(\alpha1+\alpha2)$ $\xi=(\beta1+\beta2+RAC \text{ frame length})/(\alpha1+\alpha2+IAC \text{ frame length})$ $\xi=(\beta1+\beta2+\gamma)/(\alpha1+\alpha2+\alpha3)$ $\xi=(\beta1+\beta2+\gamma+RAC \text{ frame length})/(\alpha1+\alpha2+\alpha3+IAC \text{ frame length})$ The following calculation methods satisfying the reciprocal relationships with each foregoing ξ may be used.

$\xi=\alpha1/\beta1=\alpha2/\beta2$ $\xi=(\alpha1+SIFS)/(\beta1+SIFS)=(\alpha2+SIFS)/(\beta2+SIFS)$ $\xi=(TXOP \text{ length})/(\beta1+\beta2)$ $\xi=(TXOP \text{ length})/(\beta1+\beta2+RAC \text{ frame length})$ $\xi=(TXOP \text{ length})/(\beta1+\beta2+\gamma)$ $\xi=(TXOP \text{ length})/(\beta1+\beta2+\gamma+RAC \text{ frame length})$ $(\alpha1+\alpha2)/(\beta1+\beta2)$ $\xi=(\alpha1+\alpha2+IAC \text{ frame length})/(\beta1+\beta2+RAC \text{ frame length})$ $\xi=(\alpha1+\alpha2+\alpha3)/(\beta1+\beta2+\gamma)$ $\xi=(\alpha1+\alpha2+\alpha3+IAC \text{ frame length})/(\beta1+\beta2+\beta3+RAC \text{ frame length})$ A variety of calculation methods may be taken into consideration other than the aforementioned example.

A method other than those of FIG. 8 and FIG. 9 is available, as an operation example of the communication method during the TXOP period in the bi-directional data transfer in the first embodiment.

The initiator determines the Aggregation frame length to be transmitted and the RDG Duration length to be provided to the responder on the basis of the values of the TXOP length and the ratio ξ and the definition formula of the ratio ξ to communicate in the bi-directional data transfer.

As mentioned above, according to the first embodiment, the ratio ξ can determines the RDG Duration in performing communications in the bi-directional data transfer. The first embodiment can easily determine the RDG Duration by storing the ratio ξ to determine the RDG Duration in the data transmission/reception processing unit (104 or 204).

In the communications through the bi-directional data transfer, each frame interval wholly becomes the SIFS interval, so that time to be used for RDG Duration calculation processing becomes extremely short one. Therefore, in the case of mounting of the wireless LAN base band LSI, the RDG Duration calculation processing has to be designed in hardware.

Since the first embodiment facilitates the RDG Duration determination method, it becomes possible for the method to design the RDG Duration in hardware in the case of the mounting of the wireless LAN base band LSI. And it is possible to install different software for the AP 100 and the STA 200 on the same hardware design by performing hardware design for the data transmission/reception processing unit (104 or 204) and the channel access control unit (105 or 205) and by performing software design for other units and also it becomes possible for the hardware-designed units to be brought into common. It is hard for the hardware design to perform complicated calculation processing; however it is possible for the first embodiment to conduct complicated calculation processing to determine the ratio $\xi$ by means of software-designed units and determine the RDG Duration by the hardware-designed units, based on the ratio $\xi$ resulting from a software calculation.

Hereinafter, in the second to the fourth embodiments, the cases of the use of the EDCA methods will be explained. In terms of calculation methods of the ratio $\xi$ for use in the determination of the RDG Duration to be assigned to the responder in the bi-directional data transfer, the second embodiment will show an example to calculate the ratio $\xi$ depending on the number of the set traffic streams (set ratio $\xi$ for each access category, or set ratio $\xi$ to common value regardless of access category). And the third embodiment will show an example to calculate depending on the sum of required throughput (Mean Data Rate) (Required amount of band assignment requirement) instead of the number of TSs in the second embodiment and the forth embodiment will show an example to also take required throughput of the TCP-Ack into consideration in the case where the higher order layer employs the TCP in the third embodiment, respectively.

The fifth to ninth embodiments will explain about each case of the use of the HCCA method. In terms of the calculation method for the ratio $\xi$ used for determination of the RDG Duration to be assigned to the responder in the bi-directional data transfer method explained in the first embodiment, the fifth embodiment will show an example to calculate the ratio $\xi$ on the basis of the number of the TSs for the HCCA to the same terminal (uniform ratio $\xi$ for each terminal), and the sixth embodiment will show an example to calculate on the basis of the sum of the required throughput (Mean Data Rate) instead of the number of the TSs in the fifth embodiment. And the seventh embodiment will show an example to also take the required throughput of the TCP-Ack into consideration in the case of a higher order layer employs the TCP in the sixth embodiment, respectively. The eighth embodiment will show an example in the case of setting of the ratio $\xi$ to an uniform ratio for each suite of terminals and priorities [traffic IDs (TIDs)] (traffic streams), and the ninth embodiment will show an example in the case where a TS for direct link of inter-terminal communication is established, respectively.

SECOND EMBODIMENT

Hereinafter, the second embodiment will be described.

Relationships between the priorities (TID) and the traffic stream (TS) will be described, at first.

The IEEE 802.11 can give the TID to data to be transmitted. The TID is expressed in figures like TID=0 to 15 and the data with a high TID will be obtained along with the increase of the figures. The data with a lower TID of TID=0 to 7 is transmitted in the EDCA method being a competitive method and the data with a higher TID of TID=8 to 15 is transmitted in the HCCA method being an uncompetitive method.

The HCCA method needs to set the TS to transmit/receive the data with TID=8 to 5.

The STA 200 desiring to transmit/receive the data of TID=8 to 15 prepares the TSPEC with a desired TID, a desired transmission direction (for Down link to receive from AP, for Up link to transmit to AP, for Bi-directional link to bi-directional transmit/receive to/form AP or inter-terminal communication direct link), a required throughput (Mean data rate), and a delay allowance value (Delay bound), etc., described therein and transmits an 'ADDTS.request frame' including the TSPEC to the AP 100.

The AP 100 determines whether or not it can satisfy a data transmission request required by the TSPEC in the 'ADDTS.request frame', and if it can satisfy the transmission request, it notifies the reception of the transmission request through the 'ADDTS.request frame' to set the TS. If it cannot satisfy the transmission request, the AP 100 notifies a receivable TSPEC value through the 'ADDTS.request frame' or notifies the fact of refusal of the TS thorough the 'ADDTS.request frame'.

When the TS is set, the AP 100 transmits, during a non-competitive period used in the HCCA method, the DATA of Down link so as to satisfy the value promised in the TSPEC or transmits a QoS Cf-Poll frame for the Up link or the data transmission of the inter-terminal communication.

Each TS is respectively unique for each STA 200 and also for each TID and the AP 100 cannot make communications in the HCCA method without setting the TS. The AP 100 therefore makes the communications in the EDCA method for the data with the TID of 8 to 15 and with no TS set therein.

The EDCA method classifies the TID of 0 to 7 into four types of access categories of AC_VO, AC_VI, AC_BE and AC_BK. More specifically, TID=6 and 7 correspond to the AC_VO, TID=4 and 5 correspond to the AC_VI, TID=0 and 3 correspond to the AC_BE, and TID=1 and 2 correspond to AC_BK. In the EDCA method, the AC_VO has the highest TID and the TIDs become lower in the order of the AC_VI, AC_BE and AC_BK. The EDCA method secures the QoS for the data different in TID by making the time required to obtain the transmission right and the length of the TXOP possible to be obtains different in value for these four types of access categories.

FIG. 10 shows the example of the EDCA parameter sets (EDCA parameter sets) to be used in the second embodiment.

A variety of parameters for use in the EDCA method are gathered as the EDCA parameter sets shown in FIG. 10 to put them into the Beacon frame periodically transmitted from the AP 100 and transmitted, then, they become parameters to be used by the STA 200 in the BSS 300.

The EDCA parameter sets shown in FIG. 10 are ones in which 'Bidirectional ratio' are added to the existing EDCA parameter sets, as a new parameter. FIG. 10 shows values of six types of parameters of 'CW min', 'CW max', 'AIFSN', 'TXOP Limit', 'ACM bit' and 'Bidirectional ratio' in rows of four types of access categories of the AC_VO, AC_VI, AC_BE and AC_BK.

Five types of parameters of the CW min, CW max, AIFSN', TXOP Limit and ACM bit other than the 'Bidirectional ratio' which has been newly added in the second embodiment are existing parameters and the values of the 'CW min', 'CW max', 'AIFSN', 'TXOP Limit' and 'ACM bit' described in FIG. 10 are the default values described in the IEEE 802.11e.

The three types of parameters of the 'CW min', 'CW max' and 'AIFSN' among each parameter indicate the time required to obtain the transmission rights in each access category, the 'TXOP Limit' indicates the length of the TXOP to be obtained and the 'ACM bit' indicates the presence or absence of necessity of admission control in the corresponding access categories.

In this case, the admission control indicated though the 'ACM bit' functions as a method for preventing a data communication of the AC_VO and AC_VI with a higher TID from continuously occupying the data communication period in the EDCA method and preventing data communications of the access category with a lower TID and of other STAs 200 from being disabled. When the 'ACM bits' of the AC_VO and AC_VI, as shown in FIG. 10, have become '1', in the case of data transmission in the EDCA method using the parameters of 'AC_VO' or 'AC_VI', the TS with the TID corresponding to 'AC_VO' or 'AC_VI' are established, then, communications can be performed by using the access category with the 'ACM bit' of '1' when the ' Medium Time' to be used in the admission control is present in the TSPEC. For the purpose of this communication, if the AP 100 uses the access category with the 'ACM bit' of '1', it is needed for the TS to be established in the access category. When transmitting the data having the TID corresponding to the access category with 'ACM bit' of '1' but without setting of TS, it is necessary for the data to be transmitted by lowering the TID to the access category with 'ACM bit' of '0'.

The newly added 'Bidirectional ratio' is the ratio $\xi$ for the case of the use of the bi-directional data transfer method described in the first embodiment. That is, in the second embodiment, this ratio $\xi$ is added to the EDCA parameter sets to be transmitted through the Beacon frame periodically transmitted from the AP 100 and to be notified to the STA 200 in the BSS 300.

The values shown in FIG. 10 are examples and the values are not limited to those shown in FIG. 10.

FIG. 10 shows a method for setting the 'Bi-directional ratio', namely the ratio $\xi$, for each access category by way of example; however a method for setting the 'Bidirectional ratio', namely the ratio $\xi$ to a common value (for example, uniform value in radio communication system managed by AP 100) regardless of the access category is usable.

FIG. 11 shows the configuration of the AP 100 in the second embodiment.

The AP 100 comprises, as shown in FIG. 11, a TS setting unit 106, a Beacon frame generation unit 101, a terminal information management unit 102, a transmission queue 103, a data transmission/reception processing unit 104 and a channel access control unit 105.

The TS setting unit 106 determines whether or not to accept a TS required from the STA 200 to set the TS.

The terminal information management unit 102 manages information, having to be managed by self apparatus (STA 200), such as information in association with the AP 100 and information in negotiating with the AP 100 for the TS and information in setting-up for the Block Ack, inter-terminal communication. The terminal information management unit 102 then calculates the EDCA Parameter sets depending on the set TS and the communication situation in the BSS 300 to notify them to the Beacon frame generation unit 101 and also calculates the EDCA Parameter sets to be used by the AP 100.

The Beacon frame generation unit 101 stores the EDCA Parameter sets notified from the terminal information management unit 102 and other parameters to be used in the BSS 300 and prepares the Beacon frame by using the parameters stored at the Beacon transmission time.

The transmission queue 103 buffers the transmission data.

The data transmission/reception processing unit 104 performs processing necessary for the data transmission/reception.

The channel access control unit 15 performs observation of a radio channel to obtain the transmission right and back-off processing in the data transmission/reception.

FIG. 12 shows the configuration of the STA in the second embodiment.

The STA includes, as shown in FIG. 12, a TS setting unit 206, a Beacon frame identification unit 201, a terminal information management unit 202, a transmission queue 203, a data transmission/reception processing unit 204 and a channel access control unit 205.

The TS setting unit 206 exchange frames to set the AP 100 and the TS in the case of an occurrence of a transmission or a reception request of data with TID of 8 to 15.

The Beacon frame identification unit 201 takes out information in the BSS 300 described in the Beacon frame received from the AP 100 to store its information in the identification unit 201. The terminal information management unit 202 manages information to be managed by the STA 200, such as information in having made an association with the AP 100, information in having made negotiation for the TS and information in having set up of the Block Ack and an inter-terminal communication.

The transmission queue 203 buffers the transmission data.

The data transmission/reception processing unit 204 performs processing necessary for the data transmission/reception.

The cannel access control unit 205 performs observation of a radio channel to obtain the transmission right in the data transmission/reception and back-off processing.

In the second embodiment, in terms of a method for determining the 'Bidirectional ratio' (ratio $\xi$ of first embodiment) used in the bi-directional data transfer, as will be described in detail hereinafter, a method for calculating the ratio $\xi$ by using the number of TSs set for each transmission direction will be described.

In the EDCA method, as mentioned above, in the case of the use of the access category with 'ACM bit' of '1', the TS has to be set. In the second embodiment, the 'Bidirectional ratio' (ratio $\xi$) is determined, based on the number of the TSs. Here, the case that the AP 100 determines the 'Bidirectional ratio' (ratio $\xi$) to the EDCA Parameter sets shown in FIG. 10 will be described by way of specific example.

In the EDCA Parameter sets in FIG. 10, since the 'ACM bit' of AC_VO and AC_VI are set to '1', the TS should be established to make a communication between the AC_VO and the AC_VI. Accordingly, in the example in FIG. 10, the number of the TSs established for each AC_VO and AC_VI is bought into use.

When the setting request of the first TS of the AC_VO is issued from the STA 200, the STA 200 prepares the TSPEC by the TS setting unit 206 in FIG. 12 and insets it into the 'ADDTS.request frame' to transmit it to the AP 100.

When receiving the 'ADDTS.request frame', the AP 100 determines whether or not the TS setting unit 106 in FIG. 11 accepts the TS to replies through the 'ADDTS.request frame'.

When the STA 200 in the BSS 300 sets the first TS of the AC_VO by this frame exchange, the AP 100 manages the value of the set TSPEC by means of the terminal information management unit 102 in FIG. 11 and waits for a fixed time period until a plurality of TSs will be set. At this time, the 'Bidirectional ratio' is kept in the default value. This default value may be determined arbitrarily.

After waiting for the fixed time period until the plurality of TSs will be set, the AP 100 determines the ratio $\xi$ from the TSPEC, stored in the terminal information management unit 102 in FIG. 11, by the use of formulas expressed as follows.

In terms of an example of a calculation formula for determining the 'Bi-directional ratio', a method for calculating the ratio $\xi$ being the 'Bidirectional ratio' for use in the bi-directional data transfer method in accordance with the following formulas are available, in the case of the presence of 'a' pieces of TS for Down Link (from AP 100 to STA 200), 'b' pieces of TS for Up Link (from STA to AP) and 'c' pieces of TS for Bidirectional Link (to both AP and STA), as the TS in each transmission direction for AC_VO.

(1) in the case of use of $\xi=\beta 2/\alpha$ and $\xi=\beta 1/\alpha 1$;

$\xi=(b+c)/(a+c)$, or $\xi=b/a$ (2) in the case of use of $\xi=\alpha/\beta$ and $\xi=\alpha 1/\beta 1$;

$\xi=(a+c)/(b+c)$, or $\xi=a/b$ or, for example, the following formulas are available.

(1) in the case of use of $\xi=\beta/\alpha$ and $\xi=\beta 1/\alpha 1$;

$\xi=(b+k\times c)/(a+k\times c)$, ($k$ is arbitrary constant of $0 \leq k \leq 1$)

(2) in the case of use of $\xi=\alpha/\beta$ and $\xi=\alpha 1/\beta 1$;

$\xi=(a+k\times c)/(b+k\times c)$, ($k$ is arbitrary constant of $0 \leq k \leq 1$)

A variety of calculation methods are considerable other than the above-mentioned examples.

The AP 100 notifies the calculated ratio $\xi$ as the 'Bi-directional ratio' of the EDCA Parameter sets used by the STA 200 in the BSS 300 and notifies the ratio $1/\xi$ being an inverse of the ratio $\xi$ for the STA 200 as the 'Bi-directional ratio' of the EDCA Parameter sets used by the AP 100, to the Beacon frame generation unit 11 in FIG. 11.

The Beacon frame generation unit 11 of the AP 100 manages the EDCA Parameter sets used by the STA 200 in the BSS 300 and the EDCA Parameter sets used by AP 100. The ratio $1/\xi$ of the 'Bi-directional ratio' of the EDCA Parameter sets and the 'TXOP Limit' are notified to the data transmission/reception processing unit 104 and the 'CW min', 'CW max' and 'AIFSN' are notified to the channel access control unit 105 to be used for the data transmission/reception.

The EDCA Parameter sets used by the STA 200 in the BSS 300 are inserted into the Beacon frame by means of the Beacon frame generation unit 101 of the AP 100 to be broadcast-transmitted in the BSS 300. The STA 200 in the BSS 300 takes out the EDCA Parameter sets from the Beacon frame received by the Beacon frame identification unit 31 in FIG. 12 and notifies the ratio $\xi$ of the 'Bi-directional ratio' and the 'TXOP Limit' to the data transmission/reception processing unit 204 and notifies the 'CW win', 'CW max' and 'AIFSN' to the channel access control unit 205 to use them for the data transmission/reception.

The bi-directional data transfer method performs the data transmission/reception by applying the ratio $\xi$ and the ratio 1/calculated in the second embodiment to the calculation method (definition formula of ratio $\xi$) described in the first embodiment.

According to the second embodiment, in the case of the communication through the bi-directional data transfer, it is possible to be determined by reflecting the number of the established TSs. In addition, the second embodiment can separate a part to calculate the ratio of the RDG Duration by reflecting the number of the established TSs and a part to assign the RDG Duration on the basis of the set ratio as modules.

Having explained the method for determining the ratio $\xi$ after waiting for the fixed time period until a plurality of TSs will be obtained, a method for calculating the ratio $\xi$ by means of the above-mentioned method to change the EDCA Parameter sets when the first TS has been set or at every time when the setting situation of the TS has been changed without waiting for the time of establishment of the plurality of TSs in determination of the ratio $\xi$. This point goes same for other embodiments.

THIRD EMBODIMENT

Hereinafter, the different point between the third embodiment and the second embodiment will be described mainly.

The point different from the second embodiment is a method for determining the ratio $\xi$ of the 'Bi-directional ratio' of the EDCA Parameter sets. In the second embodiment, having calculated the ratio $\xi$ of the 'Bi-directional ratio's of the EDCA Parameter sets on the basis of the number of the TSs established for each transmission direction, the third embodiment calculates it depending on the sum of the required throughput (Mean Data Rate) of the TSs which have been set for each transmission direction.

A configuration example of the AP 100 in the third embodiment may be the same as that of the second embodiment shown in FIG. 11. A configuration example of the STA 200 in the third embodiment may be the same as that of the second embodiment shown in FIG. 12. The third embodiment will be described by using the EDCA Parameter sets shown in FIG. 10.

In the third embodiment, likewise the second embodiment, when the first TS of the AC_VO has been set from the STA 200 in the BSS 300, the AP 100 manages the value of the set TSPEC by the terminal information management unit 12 in FIG. 11 to wait for a fixed time period until a plurality of TSs will be set. At this time, The 'Bi-directional ratio' is kept in the default value.

After waiting for the fixed time period until the plurality of TSs will be set, the AP 100 determines the ratio $\xi$ from the TSPEC stored in the terminal information management unit 12 in FIG. 11, by the use of, for example, the calculation formula examples shown as follow.

The terminal information management unit 102 of the AP 100, for the purpose of calculation of the ratio $\xi$ being the 'Bidirectional ratio' to be used in the bi-directional data transfer, collects the required throughput (Mean Data Rate) as a total value from a plurality of TSs set for the AC_VO, by dividing the required throughput (Mean Data Rate) into a throughput of 'a' Mbps for Down Link (from AP to STA), a throughput of 'b' Mbps for Up Link (from STA to AP) and a throughput of 'c' Mbps for Bidirectional Link (to both AP and STA).

The AP 100 calculates the ratio $\xi$ by using the following calculation formulas shown as examples.

(1) in the case of use of $\xi=\beta/\alpha$ and $\xi=\beta 1/\alpha 1$;

$\xi=(b+c)/(a+c)$, or $\xi=b/a$ (2) in the case of use of $\xi=\alpha/\beta$ and $\xi=\alpha 1/\beta 1$;

$\xi=(a+c)/(b+c)$, or $\xi=a/b$ or, for example, the following formulas are available.
(1) in the case of use of $\xi=\beta/\alpha$ and $\xi=\beta 1/\alpha 1$;

$\xi=(b+k\times c)/(a+k\times c)$, ($k$ is arbitrary constant of $0\leq k\leq 1$ (2) in the case of use of $\xi=\alpha/\beta$ and $\xi=\alpha 1/\beta 1$;

$\xi=(a+k\times c)/(b+k\times c)$, ($k$ is arbitrary constant of $0\leq k\leq 1$)

A variety of calculation methods are considerable other than the above-mentioned examples.

Likewise the second embodiment, the calculated ratio ξ is used as the 'Bidirectional ratio' of the EDCA Parameter sets used by the STA 200 in the BSS 300. The AP 100 uses the ratio 1/ξ being the inverse of the ratio ξ of the STA 200 as the 'Bidirectional ratio' of the EDCA Parameter sets.

According to the third embodiment, when making communications in the bi-directional data transfer, the bi-directional data transfer method can set the ratio of the band required actually to the ratio of the TXOP used by the initiator and the responder in its transfer method by determining the RDG Duration with reflecting the required throughput (Mean Data Rate) of the established TS. And the bi-directional data transfer method can assign the band required by the initiator and the responder in its transfer method.

FOURTH EMBODIMENT

Hereinafter, the fourth embodiment will be explained mainly at a point different from the third embodiment.

The point differing form the third embodiment is a determination method for the ratio ξ of the 'Bi-directional ratio' of the EDCA Parameter sets. Having calculated the ratio ξ of the 'Bidirectional ratio' of the EDCA Parameter sets on the basis the sum of the required throughput (Mean Data Rate) of the TSs which have been set for each transmission direction, when calculating on the basis the sum of the required throughput (Mean Data Rate) of the TS which has been set for each transmission direction, the fourth embodiment calculates the ratio ξ for the TS of which the higher order layer is the TCP, based on the value in which the total of both of the required throughput of the TCP data and the throughput necessary for the TCP Ack for the TCP data.

The configuration example of the AP 100 of the fourth embodiment may be the same as those of the second and third embodiments. The configuration example of the STA 200 of the fourth embodiment may be the same as those of the second and third embodiments. The fourth embodiment will also be described using the EDCA Parameter sets shown in FIG. 10.

It is assumed that the radio communication apparatus in the fourth embodiment uses a MAC layer defined in the IEEE 802.11, as an L2 layer. The layer with an order higher than that of the L2 layer may have a variety of configurations depending on applications to be used and the fourth embodiment is the case that a protocol to transmit a frame such as a transmission acknowledgement frame for the transmission data in the higher order layer. The explanation of the fourth embodiment will be performed in an example that the TCP/IP protocol is employed for the higher order layer. However, the higher order layer in the fourth embodiment does not limit the protocol to the TCP/IP protocol and the present invention is applicable to other protocols.

The transmission acknowledgement frame (TCP-Ack) of the TCP layer being the layer with the order higher than that of the MAC layer is treated in the same way as that of the ordinary data frame (TCP-Data) for the MAC layer. Therefore, the data transmission in the case of the use of the TCP/IP protocol in the higher order layer performs a frame exchange for the frames between the transmission data (TCP-Data) and the transmission acknowledgement (TCP-Ack) in the TCP layer. And the data transmission also performs two frame exchanges for the frames between the transmission data (Data (TCP-Data)) and the corresponding transmission acknowledgement (Ack) of the MAC layer and the transmission acknowledgement [Data (TCP-Ack)] of the TCP layer and the corresponding transmission acknowledgement (Ack) of the MAC layer. That is, two types of transmission acknowledgements are performed for each layer.

Figure 13:
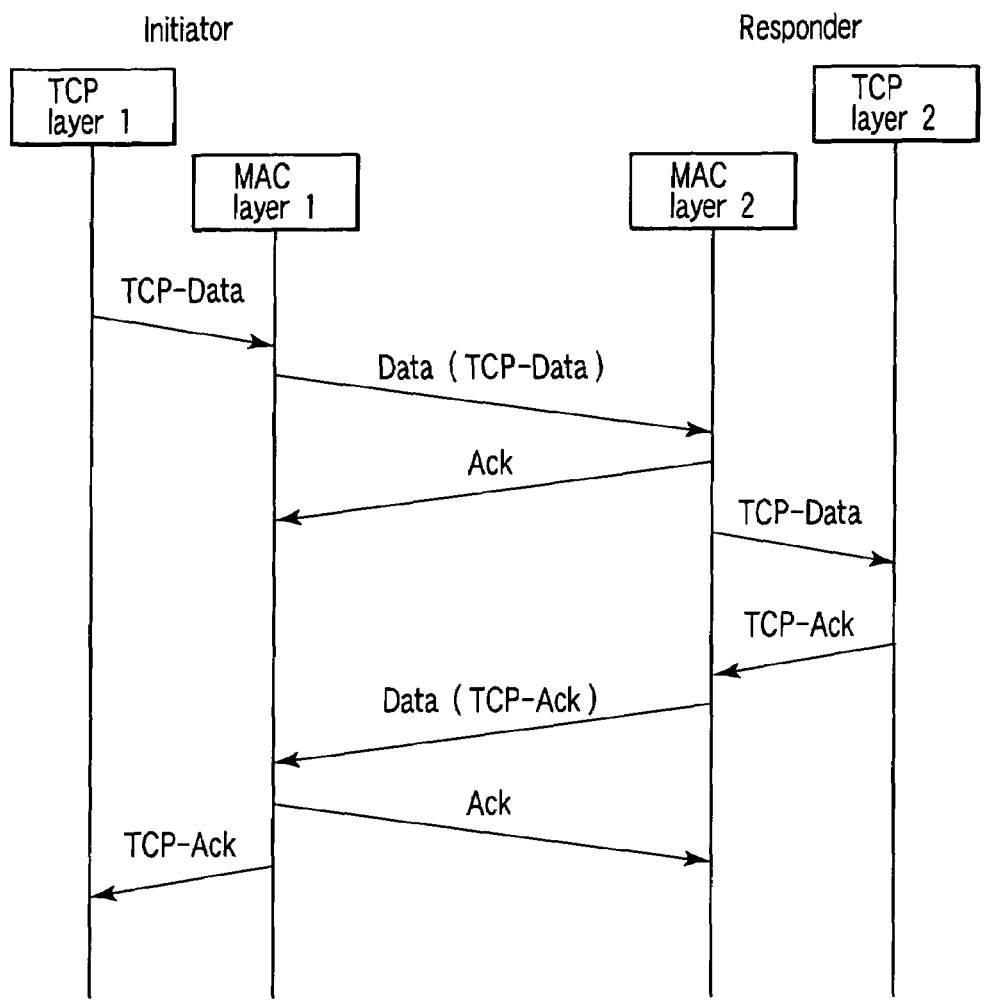
FIG. 13 is an exemplary view showing an example of a data transmitting/receiving method through a TCP layer and a MAC layer.

FIG. 13 shows the example of the data transmission/reception in the use of the TCP layer and the MAC layer.

When the TCP layer 1 of the initiator transmits the TCP-Data, as shown in FIG. 13, the MAC layer 1 of the initiator transmits the TCP-Data as the Data frame of the MAC layer and receives the transmission acknowledgement (Ack) of the MAC layer then transmits the TCP-Data to the TCP layer 2 of the responder. The TCP layer 2 of the responder which has received the TCP-Data transmits the TCP-Ack to be the transmission acknowledgement for the received TCP-Data. The TCP-Ack is transmitted, as the Data frame of the MAC layer, from the MAC layer 2 of the responder then the data transmission/reception method receives the transmission acknowledgement (Ack) of the MAC layer to transmits the TCP Data up to the TCP layer 1 of the initiator. Thereby, the data transmission/reception method completes the transmission acknowledgement of the TCP-Data to complete the transmission of the TCP-Data.

As described above, the data transmission in the case of the use of the TCP/IP protocol for the higher order layer does not perform the data transmission/reception through the TCP without performing a bi-directional transmission/reception of data in a MAC level. That is to say, when setting the TS with the TCP/IP protocol in the higher order layer used therein, a data communication has to be made toward the set transmission direction and a data communication for the TCP-Ack to be made simultaneously toward an inverse direction. Regarding the way to recognize the type of the protocol used for the higher order layer by means of the MAC layer, the data transmission/reception method can recognize the type of the protocol used for the higher order layer by means of the MAC layer through the use of the TCLAS when setting the TS by the 'ADDTS request frame' and the 'ADDTS response frame' of the IEEE 802.11e.

In the fourth embodiment, in the case of the use of the TCP/IP protocol for the higher order layer, the data transmission/reception method uses the TCLAS in the setting of the TS to notify the fact that it has set the TS with the TCP/IP used therein. However, for the way that the MAC layer recognizes the fact of the use of the TCP/IP for the higher order layer, other than the way with the TCLAS used therein, the data transmission/reception method may use other way such as a way to use an interface between the MAC layer and the higher order layer.

The terminal information management unit 102 of the AP 100, likewise the third embodiment, for the purpose of calculation of the ratio ξ being the 'Bi-directional ratio' to be used in the bi-directional data transfer, collects a total value of throughputs by dividing the required throughput (Mean Data Rate) from a plurality of TSs set for the AC_VO into a throughput of 'a' Mbps for Down Link (from AP to STA), a throughput of 'b' Mbps for Up Link (from STA to AP) and a throughput of 'c' Mbps for Bi-directional Link (to both AP and STA).

In the fourth embodiment, as differing from the third embodiment, the terminal information management unit 102 of the AP 100, for the purpose of calculation of the ratio $\xi$, collects throughputs of 'x' Mbps for Down Link (from AP to STA), of 'y' Mbps for Up Link (from STA to AP) and of 'z' Mbps for Bidirectional Link (to both AP and STA) as a throughput necessary for the TCP-Ack and uses the total value then calculates the ratio $\xi$ by using the calculation formula examples shown as follows.

Wherein, 'a', 'b' and 'c' are the same as those of the third embodiment.

(1) in the case of use of $\xi=\beta/\alpha$ and $\xi=\beta 1/\alpha 1$;

$\xi=(b+c+y+z)/(a+c+x+z)$, or $\xi=(b+y)/(a+x)$ (2) in the case of use of $\xi=\alpha/\beta$ and $\xi=\alpha 1/\beta 1$;

$\xi=(a+c+x+z)/(b+c+y+z)$, or $\xi=(a+x)/(b+y)$ or, for example, the following formulas are available.

(1) in the case of use of $\xi=\beta/\alpha$ and $\xi=\beta 1/\alpha 1$;

$\xi=(b+k1\times c+y+k2\times z)/(a+k1\times c+x+k2\times z)$, ($k1$ is arbitrary constant of $0 \leq k1 \leq 1$, $k2$ is arbitrary constant of $0 \leq k2 \leq 1$)

(2) in the case of use of $\xi=\alpha/\beta$ and $\xi=\alpha 1/\beta 1$;

$\xi=(a+k1\times c+x+k2\times z)/(b+k1\times c+y+k2\times z)$, ($k1$ is arbitrary constant of $0 \leq k1 \leq 1$, $k2$ is arbitrary constant of $0 \leq k2 \leq 1$)

A variety of calculation methods are considerable other than the above-mentioned examples.

Likewise the third embodiment, the calculated ratio $\xi$ is set to the 'Bi-directional ratio' of the EDCA Parameter sets used by the STA 200 in the BSS 300. The AP 100 uses the ratio $1/\xi$ being the inverse of the ratio $\xi$ of the STA 200 as the 'Bi-directional ratio' of the EDCA Parameter sets.

According to the fourth embodiment, when making communications in the bi-directional data transfer, the bi-directional data transfer method can set the ratio in which a band necessary for the TCP-Ack is also added to a band necessary for the transmission of the TCP-Ack by determining the RDG Duration with reflecting the band necessary for the transmission of the TCP-Ack in the case of use of the TCP/IP protocol in the higher order layer. Furthermore, the bi-directional data transfer method can assign the band; necessary for the TS set by the use of the bi-directional data transfer method, to both transmission and responders though a single TXOP and can make communications through the TCP/IP protocol smoothly.

Having described about the cases of the EDCA method in the forgoing second to fourth embodiments, the cases of the HCCA method will be mentioned in the fifth to ninth embodiments.

FIFTH EMBODIMENT

In the fifth embodiment, as a calculation method of the ratio $\xi$ used for determining the RDG Duration to be assigned to the responder in the bi-directional data transfer which has been described in the first embodiment, a method is adopted, wherein the method calculates the ratio $\xi$ as uniform ratios for each terminal when each terminal conducts the data transmission in the HCCA method. The fifth embodiment calculates the ratio $\xi$ of the 'Bidirectional ratio' of the EDCA Parameter sets on the basis of the number of the TSs for the HCCA which has been set respectively toward each transmission direction for the same terminal (refer to the second embodiment).

The configuration example of the AP 100 of the fifth embodiment may be the same as those of the second to fourth embodiments (FIG. 11). The configuration example of the STA 200 in the fifth embodiment may be the same as those of the second to fourth embodiments (FIG. 12).

In the IEEE 802.11, to transfer the data with a high priority of TID=8 to 15 in the HCCA method, it is needed for obtaining of a band for the HCCA method to set the TS. In the fifth embodiment, when occurring a transmission request or a reception request of data with any TID of TID=8 to 15, the STA 200 prepares the TSPEC by the TS setting unit 206 in FIG. 12 and insert it into the 'ADDTS.request frame' to transmit it to the AP 100.

When receiving the 'ADDTS.request frame', the AP 100 determines whether or not accepts the TS by means of the TS setting unit 106 to reply the determination though the 'ADDTS.request frame'.

With this frame exchange, if the TS has been set, the AP 100 stores the value of the set TSPEC by the terminal information management unit 102 in FIG. 11. The terminal information management unit 102 in FIG. 11 of the AP 100 stores the TSPEC of all TSs which have been currently set.

The fifth embodiment determines the ratio $\xi$ to be used to decide the RDG Duration in the bi-directional data transfer by using the calculation formula examples shown as follows.

The terminal information management unit 102 of the AP 100, for the purpose of calculation of the ratio $\xi$ being the 'Bi-directional ratio' to be used in the bi-directional data transfer, uses the calculation formula examples shown as follows, when there are, as TSs for each transmission direction, 'a' pieces of TSs for Down Link (from AP to STA), 'b' pieces thereof for Up Link (from STA to AP) and 'c' pieces thereof for Bi-directional Link (to both AP and STA), from the TS, for the HCCA to the same STA 200, stored in the terminal information management unit 102 of the AP 100.

(1) in the case of use of $\xi=\beta/\alpha$ and $\xi=\beta 1/\alpha 1$;

$\xi=(b+c)/(a+c)$, or $\xi=b/a$ (2) in the case of use of $\xi=\alpha/\beta$ and $\xi=\alpha 1/\beta 1$;

$\xi=(a+c)/(b+c)$, or $\xi=a/b$ or, for example, the following formulas are available.

(1) in the case of use of $\xi=\beta/\alpha$ and $\xi=\beta 1/\alpha 1$;

$\xi=(b+k\times c)/(a+k\times c)$, ($k$ is arbitrary constant of $0 \leq k \leq 1$)

(2) in the case of use of $\xi=\alpha/\beta$ and $\xi=\alpha/\beta 1$;

$\xi=(a+k\times c)/(b+k\times c)$, ($k$ is arbitrary constant of $0 \leq k \leq 1$)

A variety of calculation methods are considerable other than the above-mentioned examples.

The terminal information management unit 102 of the AP 100 stores the calculated ratio $\xi$ for each STA 200.

To use the calculated ratio $\xi$ for the data transmission/reception in the bi-directional data transfer method in the method described in the first embodiment, the terminal information management unit 102 of the AP 100 notifies the ratio ξ to the data transmission/reception processing unit 104 to use it in the determination of the RDG Duration in the HCCA method.

According to the fifth embodiment, in making communications through the bi-directional data transfer method, the RDG Duration may be determined by reflecting the number of the established TSs. The fifth embodiment can separate, as modules, a part to calculate the ratio ξ of the RDG Duration by reflecting the number of the established TSs from a part to assign the RDG Duration, based on the determined ratio ξ.

SIXTH EMBODIMENT

Hereinafter, the sixth embodiment will be described mainly at a point different form the fifth embodiment.

The point different from the fifth embodiment is a determination method of the ratio ξ used in the determination of the RDG Duration in the bi-directional data transfer method. In the fifth embodiment, having calculated the ratio ξ depending on the number of the TSs for the HCCA which have been set for each transmission direction to the same terminal, the sixth embodiment calculates the ratio ξ depending on the total of the required throughputs (Mean Data Rate) of the TSs for the HCCA which have been set respectively for each transmission direction to the same terminal (refer to the third embodiment).

The configuration example of the AP 100 in the sixth embodiment may be the same as those of the second to fifth embodiment (FIG. 11). The configuration example of the STA 200 in the sixth embodiment may be the same as those of the second to fifth embodiments (FIG. 12).

In the sixth embodiment, likewise the fifth embodiment, when occurring a transmission request or a reception request for data having any TID of 8 to 15, the STA 200 generates the TSPEC by means of the TS setting unit 206 in FIG. 12 and input it to the 'ADDTS.request frame' to transmit it to the AP 100.

When receiving the 'ADDTS.request frame', the AP 100 determines whether the TS should be accepted or not through the TS setting unit 106 in FIG. 11 to reply through the 'ADDTS.request frame'.

When the TSs have been set by this frame exchange, the AP 100 stores the value of the set TSPEC in the terminal information management unit 102 in FIG. 11. The terminal information management unit 102 in FIG. 11 has stored all TSs which are currently set.

The sixth embodiment determines the ratio ξ to be used to determine the RDG Duration in the bi-directional data transfer by using the calculation formula examples shown as follows.

The terminal information management unit 102 of the AP 100, for the purpose of calculation of the ratio ξ being the 'Bidirectional ratio' to be used in the bi-directional data transfer, collects the required throughput (Mean Data Rate) of a plurality of TSs set for the HCCA which have been set to the same SAT 200 stored in the terminal information management unit 102 of the AP 100, as a total value, by dividing the required throughput into a throughput of 'a' Mbps for Down Link (from AP to STA), a throughput of 'b' Mbps for Up Link (from STA to AP) and a throughput of 'c' Mbps for Bidirectional Link (to both AP and STA), as TSs for each transmission direction.

The AP 100 calculates the ratio ξ by using the following calculation formulas shown as examples.

(1) in the case of use of ξ=β/α and ξ=β1/α1;

$$\xi = (b+c)/(a+c), \text{ or}$$

$$\xi = b/a$$

(2) in the case of use of ξ=α/β and ξ=α1/β1;

$$\xi = (a+c)/(b+c), \text{ or}$$

$$\xi = a/b$$

or, for example, the following formulas are available.
(1) in the case of use of ξ=β/α and ξ=β1/α1;

$$\xi = (b+k \times c)/(a+k \times c), (k \text{ is arbitrary constant of } 0 \leq k \leq 1)$$

(2) in the case of use of ξ=α/β and ξ=α1/β1;

$$\xi = (a+k \times c)/(b+k \times c), (k \text{ is arbitrary constant of } 0 \leq k \leq 1)$$

A variety of calculation methods are considerable other than the above-mentioned examples.

Likewise the fifth embodiment, the terminal information management unit 102 of the AP 100 stores the calculated ratio ξ for each STA 200.

The terminal information management unit 102 of the AP 100 notifies the ratio ξ to the data transmission/reception unit 104 in order to use it for the data transmission/reception in the bi-directional data transfer method and also for the determination of the RDG Duration in the HCCA method.

According to the sixth embodiment, when making communications in the bi-directional data transfer, the bi-directional data transfer method can set the ratio of the band required actually to the ratio of the TXOP used by the initiator and the responder in the bi-directional data transfer method by determining the RDG Duration with reflecting the required throughput (Mean Data Rate) of the established TS and assign the band required by the initiator and the responder in the bi-directional data transfer method.

SEVENTH EMBODIMENT

Hereinafter, the seventh embodiment will be described mainly at a point different form the sixth embodiment.

The point different from the sixth embodiment is a determination method of the ratio ξ used in the determination of the RDG Duration in the bi-directional data transfer method. In the sixth embodiment, having calculated the ratio ξ depending on the number of the TSs for the HCCA which have been set for each transmission direction to the same terminal, when calculating the ratio ξ depending on the total of the required throughputs (Mean Data Rate) of the TSs for the HCCA which have been set for each transmission direction to the same terminal, the seventh embodiment, when calculating the ratio ξ depending on the total of the required throughputs (Mean Data Rate) of the TS for the HCCA which have been set for each transmission direction for the same terminal, in the TS of which the higher order layer uses the TCP, calculates the ratio ξ on the basis of a value in which a total of both required throughput of the data of the TCP and the throughput necessary for the corresponding TCP-Ack is set as the required throughput (mean Data Rate) (refer to the fourth embodiment).

The configuration example of the AP 100 in the seventh embodiment may be the same as those of the second to sixth embodiment (FIG. 11). The configuration example of the STA 200 in the seventh embodiment may be the same as those of the second to sixth embodiments (FIG. 12).

The radio communication apparatus in the seventh embodiment uses the MAC layer defined to the L2 layer by the IEEE 802.11. The layer with the order higher than that of the L2 layer may have a variety of configurations by the application to be used; however in the seventh embodiment being one of the case in which a protocol, by which a frame such as a transmission acknowledgement frame for the transmission data in the higher order layer, is employed, an example of the case of the use of the TCP/IP protocol for the higher order layer will be described. However, the protocol for the higher order layer of the seventh embodiment is not limited to the TCP/IP protocol and the present invention is applicable to other protocols.

In the data transmission in the case of the use of the TCP/IP protocol for the higher order layer, the transmission acknowledgement for the transmission data for the frame exchange in the transmission data (TCP-Data) and the transmission acknowledgement (TCP-Ack) in the TCP layer and the frame exchange in the transmission data (TCP-Data) and the transmission acknowledgement (TCP-Ack) in the MAC layer are performed as tow types of transmission acknowledgements for each layer. The transmission acknowledgement frame (TCP-Ack) of the TCP layer being the layer with the order higher than that of the MAC layer is treated in the same manner applied to the usual data frame for the MAC layer.

Therefore, in the data transmission in the case of the use of the TCP/IP protocol for the higher order layer, if the data in the MAC level has not been performed in the bi-directional transmission/reception, the data transmission/reception of the TCP is not performed. That is, if the TS using the TCP/IP protocol is set to the higher order layer, the data communication for the TCP-Ack for the inverse direction has to be performed at the same time of the data communication toward the set transmission direction. A method of knowing by the MAC layer the type of the protocol used in the higher order layer is achieved by using the TCLAS when the TS is set through the 'ADDTS.request frame' and the 'ADDTS.response frame' of the IEEE 802.11e.

The seventh embodiment, in the case of the use of the TCP/IP protocol in the higher order layer, notifies the setting of the TS with the TCP/IP protocol used therein, by using the TCLAS when the TS is set. However, other method such as a method with the interface between the MAC layer and the higher order layer used therein may be usable as a method of knowing by the MAC layer the use of the TCP/IP protocol in the higher order layer.

The seventh embodiment, likewise the sixth embodiment, determines the ratio $\xi$ to be used to determine the RDG Duration in the bi-directional data transfer by using the calculation formula examples shown as follows.

The terminal information management unit 102 of the AP 100 collects, as a total value, the required throughput (Mean Data Rate), of the TSs for a plurality of HCCA which have been set to the same STA 200, stored in the terminal information management unit 102 of the AP 100, for the TSs in each transmission direction, by dividing the throughput into a throughput of 'a' Mbps for Down Link (from AP to STA), a throughput of 'b' Mbps for Up Link (from STA to AP) and a throughput of 'c' Mbps for Bidirectional Link (to both AP and STA).

The seventh embodiment, not likewise the sixth embodiment, for the purpose of the calculation of the ratio $\xi$, collects, as the throughput necessary for the TCP-Ack, a throughput of 'x' Mbps for Down Link (from AP to STA), a throughput of 'y' Mbps for Up Link (from STA to AP) and a throughput of 'z' Mbps for Bi-directional Link (to both AP and STA), and calculates the ratio $\xi$ by using the calculation formula examples shown as follows, by also using the forgoing total value.

Wherein, 'a', 'b' and 'c' are the same as those of the third embodiment.

(1) in the case of use of $\xi=\beta/\alpha$ and $\xi=\beta1/\alpha1$;

$\xi=(b+c+y+z)/(a+c+x+z)$, or $\xi=(b+y)/(a+x)$ (2) in the case of use of $\xi=\alpha/\beta$ and $\xi=\alpha1/\beta1$;

$\xi=(a+c+x+z)/(b+c+y+z)$, or $\xi=(a+x)/(b+y)$ or, for example, the following formulas are available.

(1) in the case of use of $\xi=\beta/\alpha$ and $\xi=\beta1/\alpha1$;

$\xi=(b+k1\times c+y+k2\times z)/(a+k1\times c+x+k2\times z)$, (k1 is arbitrary constant of $0\leq k1\leq 1$, k2 is arbitrary constant of $0\leq k2\leq 1$)

(2) in the case of use of a and $\xi=\alpha1/\beta1$;

$\xi=(a+k1\times c+x+k2\times z)/(b+k1\times c+y+k2\times z)$, (k1 is arbitrary constant of $0\leq k1\leq 1$, k2 is arbitrary constant of $0\leq k2\leq 1$)

A variety of calculation methods are considerable other than the above-mentioned examples.

Likewise the sixth embodiment, the calculated ratio $\xi$ is stored by the terminal information control unit 102 of the AP 100 for each STA 200.

The terminal information management unit 102 of the AP 100 notifies the calculated ratio to the data transmission/reception unit 104 to use it in the determination of the RDG Duration in the HCCA method.

According to the seventh embodiment, when making communications in the bi-directional data transfer, if the higher order layer uses the TCP/IP protocol, the bi-directional data transfer method can set the ratio in which a band necessary for the TCP-Ack is also added to a band necessary for a data amount of the TCP-Ack to be actually transmitted as the ratio of the TXOP used by the transmission and responders by determining the RDG Duration with reflecting the band necessary for the transmission of the TCP-Ack. Furthermore, the bi-directional data transfer method can assign the band needed for the TS which has been set by the use of the data transfer method to both transmission and responders though a single TXOP and can make communications through the TCP/IP protocol smoothly.

EIGHTH EMBODIMENT

Hereinafter, the eighth embodiment will be described mainly at a point different form the seventh embodiment.

The point different from the seventh embodiment is a determination method of the ratio $\xi$ used in the determination of the RDG Duration in the bi-directional data transfer method. In the seventh embodiment, having determined the ratio $\xi$ as an uniform ratio for each terminal when each terminal performs the data transmission in the HCCA method, the eighth method sets the ratio $\xi$ for each suite of the terminals and the TSs (traffic stream).

The configuration example of the AP 100 in the eighth embodiment may be the same as those of the second to seventh embodiment (FIG. 11). The configuration example of the STA 200 in the eighth embodiment may be the same as those of the second to seventh embodiments (FIG. 12).

It is assumed that the radio communication apparatus in the eighth embodiment uses the MAC layer defined in the L2 layer by the IEEE 802.11. The layer with the order higher than that of the L2 layer may have a variety of configurations depending on the application to be used. The eighth embodiment will be described as an example of using the TCP/IP protocol in the higher order layer.

A method of knowing by the MAC layer the type of the protocol used for the higher order layer is achieved by using the TCLAS when the TS has been set through the 'ADDTS.request frame' and the 'ADDTS.response frame'.

When using the TCP/IP protocol in the higher order layer, the eighth embodiment notifies the setting of the TS with the TCP/IP used therein by using the TCLAS in setting the TS. However, in addition the method using the TCLAS, other method which uses the interface between the MAC layer and the higher order layer may be usable, for the method of knowing by the MAC layer the use of the TCP/IP protocol for the higher order layer.

Likewise the seventh embodiment, in the eighth embodiment, when the STA 200 in the BSS 300 issues a transmission request or a reception request of data with the TID with any of 8 to 15, the STA 200 generates the TSPEC by the TS setting unit 206 in FIG. 12 and inserts in the 'ADDTS.request frame' to transmit it to the AP 100.

When receiving the 'ADDTS.request frame', the AP 100 determines whether or not accepts the TS by the TS setting unit 106 in FIG. 11 to make a reply through the 'ADDTS.response frame'.

By this frame exchange, when the TS has been established, the AP 100 stores the value of the parameters of the set TSPEC by the terminal information management unit 102. The terminal information management unit 102 in FIG. 11 determines the ratio $\xi$ for use in determination of the RDG Duration in the bi-directional data transfer method depending on the set TSPEC by the use of the calculation formula examples expressed below.

If a desired transmission direction of the set TSPEC is one for Down Link to perform the data transmission from the AP 100 to the SAT 200, and if the set required throughput (Mean Data Rate) is set to 'a' Mbps in the case of the use of the TCP/IP in the higher order layer, and also if a throughput necessary for the TCP-Ack is set to 'b' Mbps in the case of the performance of the TCP communication by the required throughput, the calculation formulas of the ratio $\xi$ are shown as examples as follows. If a desired transmission direction of the TSPEC is one for Up Link to perform the data transmission from the STA 200 to the AP 100, and if the set required throughput (Mean Data Rate) is set to 'b' Mbps in the case of the use of the TCP/IP in the higher order layer, and also if a throughput necessary for the TCP-Ack is set to 'a' Mbps in the case of the performance of the TCP communication by the required throughput, the calculation formulas of the ratio $\xi$ are shown as examples as follows. Or if a desired transmission direction of the TSPEC is one for Bi-directional Link to perform the bi-directional transmission/reception between the AP 100 and the STA 200, and if the required throughput (Mean Data Rate) from the AP 100 to the STA 200 is set to 'a' Mbps as the required throughput of the TS, and also if the required throughput from the STA 200 to the AP 100 is set to 'b' Mbps, the calculation formulas of the ratio $\xi$ are shown as examples as follows.

(1) in the case of use of $\xi=\beta/\alpha$ and $\xi=\beta 1/\alpha 1$;

$\xi=b/a$ (2) in the case of use of $\xi=\alpha/\beta$ and $\xi=\alpha 1/\beta 1$;

$\xi=a/b$

A variety of calculation methods may be available other than the aforementioned examples.

The terminal information management unit 102 of the AP 100 stores the calculated ratio $\xi$ together with the TSPEC. The terminal information management unit 102 of the AP 100 notifies the ratio $\xi$ to the data transmission/reception unit 104 in order to use it for the data transmission/reception in the bi-directional data transfer by means of the method described in the first embodiment and the HCCA method uses the ratio $\xi$ for the determination of the RDG Duration.

In a generation of a request for a TS from the STA 200, when desiring an amount necessary for the TCP-Ack, the STA 200 calculates the ratio $\xi$ for use in a data transmission/reception in the bi-directional data transfer to write it in the TSPEC. Then, when determining whether the TS should be accepted or not, the TS setting unit 106 of the AP 100 determines whether or not it should accept the ratio $\xi$. When varying the ratio $\xi$, the AP 100 notifies it together with the TSPEC.

According to the eighth embodiment, when making communications in the bi-directional data transfer, the bi-directional data transfer method can set the ratio of the required throughput in which a band necessary for the TCP-Ack is also added to a band necessary for the transmission of a data amount of the TCP-Data to be actually transmitted and the ratio of the required throughput for performing the bi-directional transmission/reception to the ratio of the TXOP to be used by the transmission and the responders in the bi-directional data transfer method, by determining the RDG Duration with reflecting the band necessary for the transmission of the TCP-Ack in the case of use of the TCP/IP protocol in the higher order layer. Furthermore, the bi-directional data transfer method can assign the band needed to the TS set by the use of the bi-directional data transfer method to both transmission and responders though a single TXOP and can make communications in the TCP/IP protocol of communications in the Bidirectional Link for performing the bi-directional transmission/reception between the AP 100 and the STA 200 through the TCP/IP protocol smoothly.

NINTH EMBODIMENT

Hereinafter, the different point between the ninth embodiment and the eighth embodiment will be described mainly.

This ninth embodiment differing from the eighth embodiment relates to a determination method of the ratio $\xi$ to be used in determination of the RDG Duration by the bi-directional data transfer in setting the TS which is set between the STA 200 and the AP 100 and of which the desired transmission direction is for the inter-terminal communication direct link and relates to a notification method of the determined ratio $\xi$ to the STA 200.

A configuration example of the AP 100 in the ninth embodiment may be the same as those of the second to eighth embodiments shown in FIG. 11. A configuration example of the STA 200 in the ninth embodiment may be the same as those of the second to eighth embodiments shown in FIG. 12.

The radio communication apparatus in the ninth embodiment is assumed to use the MAC layer defined in the IEEE 802.11 for the L2 layer. The layer with an order higher than that of the L2 layer may have a variety of configurations depending on applications to be used. The ninth embodiment will be represented by the use of the TCP/IP for the higher order layer as an example.

In the ninth embodiment, likewise the eighth embodiment, the STA 200 in the BSS 300 prepares the TSPEC by means of the TS setting unit 206 in FIG. 12 in a generation of a transmission or reception request of data having any TID of 8 to 15 from the STA 200 therein.

At the preparation of the TSPEC, the TS setting unit 206 in the STA 200 determines the ratio ξ of the RDG Duration to be assigned to the responder by the bi-directional data transfer method when the terminal to set the TS is assigned the TXOP being the band of the HCCA through the QoS Cf-Poll frame and in the case where the TS is one for the inter-terminal communication direct link and uses the TCP/IP protocol for the higher order layer.

If the desired throughput (Mean Data Rate) which is expected to be set by the TSPEC is set to 'a' Mbps and a TCP communication is performed through the desired throughput, and also if the throughput necessary for the TCP-Ack is set to 'b' Mbps, the ratio ξ is calculated by means of the following examples of calculation formulas.

(1) in the case of use of ξ=β/α and ξ=β1/α1;

ξ=b/a (2) in the case of use of ξ=α/β and ξ=α1/β1;

ξ=a/b

A variety of calculation methods may be available other than the aforementioned example.

As like the eighth embodiment, the calculated ratio ξ is notified together with the TSPEC. When the TS setting unit 106 of the AP 100 determines whether or not accepts the TS, it determines whether or not accepts the ratio ξ. If the ratio ξ is varied, the varied ratio ξ is notified together with the TSPEC.

The SAT 200 stores the ratio ξ notified together with the TSPEC by means of the terminal information management unit 202 in FIG. 12.

The terminal information management unit 202 of the AP 100 notifies the ratio ξ to the data transmission/reception unit 204 in order to use it for the data transmission/reception in the bi-directional data transfer by means of the method described in the first embodiment and the HCCA method uses the ratio ξ for the determination of the RDG Duration.

According to the ninth embodiment, when making communications in the bi-directional data transfer, when the bi-directional data transfer method uses the TCP/IP protocol in the higher order layer, the STA 200 and the AP 100 can share the ratio to determine the RDG Duration by reflecting the band necessary for the transmission of the TCP-Ack. Furthermore, the bi-directional data transfer method can assign the band needed to the TS set by the use of the bi-directional data transfer method to both transmission and responders though a single TXOP and can make communications through the TCP/IP protocol smoothly.

TENTH EMBODIMENT

The tenth embodiment relates to a configuration example of a radio communication apparatus for use in the bi-directional data transfer method in using the TCP/IP protocol for the higher order layer described in the fourth, seventh, eighth and ninth embodiments, wherein the communication apparatus has two transmission queues for an ordinary transmission queue and a transmission queue for TCP-Ack, as queues for transmission data.

Figure 14:
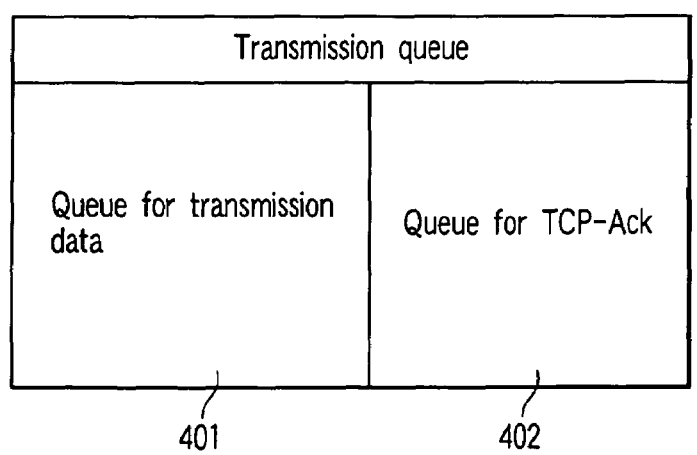
FIG. 14 is an exemplary view showing an example of a queue of a transmission queue in a radio communication apparatus regarding a tenth embodiment of the present invention.

FIG. 14 shows a configuration of the transmission queue of the ratio communication apparatus of the tenth embodiment.

The radio communication apparatus of the tenth embodiment has a configuration, as shown in FIG. 14, to divide the transmission queue into a queue 401 for ordinary transmission data (data other than TCP-Ack data) and a queue 402 for data of the TCP-Ack. The communication apparatus inserts the TCP-Ack of the TCP/IP protocol of the higher order layer into the queue 402 for the data of the TCP-Ack and inserts other data to the queue 401 for the transmission data, separately.

The communication apparatus in the tenth embodiment uses the TCP/IP protocol for the higher order layer and assigns the RDG Duration to the responder in the bi-directional data transfer method, by reflecting the band necessary to the transmission of the TCP-Ack to assign the RDG Duration.

When the communication apparatus of the tenth embodiment obtains the transmission right, the initiator takes out data form the queue for the transmission data to transmit the data. At this time, the initiator assigns a time period for the TCP/Ack to the responder, as the RDG Duration. The responder takes out the data from the queue 402 for the data of the TCP-Ack of the transmission queue to perform transmission processing.

By dividing the transmission queue into two as mentioned above, a mounting load resulting form a plurality of queues is prevented from being increased and processing of retrieving data of the corresponding TID addressed to the corresponding terminal is facilitated in comparison with the case of the not divided single transmission queue. When using the RDG Duration assigned to the data of the TCP-Ack, the communication apparatus can easily take out the data of the TCP-Ack and make a communication smoothly in accordance with an intention of the initiator which has assigned the RDG Duration to receive the TCP-Ack. Identification information showing whether the RDG Duration assigned to the responder has been assigned or not for the data of the TCP-Ack is inserted in the IAC frame then it becomes possible to confirm whether or not the assigned RDG Duration is one for the data of the TCP-Ack.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio base station apparatus used in a radio communication system in which an initiator holds a transmission opportunity (TXOP) period in a frame exchange sequence and a responder responds to the initiator in the frame exchange sequence, comprising:

a setting device configured to set a ratio between a first period necessary for transmitting a first frame from the initiator to the responder and a second period necessary for transmitting a second frame from the responder to the initiator; and a calculation device configured to calculate the first period to be used by the initiator and the second period to be used by the responder, on the basis of the transmission opportunity period and of the ratio which is set, wherein the setting device acquires a transmission amount of data that higher order layers transmit and a transmission amount of transmission acknowledgement frames for the data transmitted by the higher order layers and sets a ratio between the transmission amount of data of the higher order layers and the transmission amount of the transmission acknowledgement frames for the data transmitted by the higher order layers, when communication of the data is performed in accordance with a communication method by which two protocols are used for transmissions of the higher order layers and lower order layers, the transmission acknowledgement frames in the higher order layers are provided for the data transmissions of the higher order layers and the transmission acknowledgement frames of the higher order layers become the transmission data of the lower order layers.

2. The radio base station apparatus according to claim 1, further comprising a first notification device configured to notify information showing the ratio which is set to a plurality of radio terminal apparatuses.

3. The radio base station apparatus according to claim 2, further comprising a device configured to periodically transmit an information notification frame including information to be notified in a radio cell, wherein the first notification device notifies the information showing the ratio to each of the radio terminal apparatuses by describing the information to the information notification frame.

4. The radio base station apparatus according to claim 1, wherein the setting device sets the ratio as a common value in a radio cell.

5. The radio base station apparatus according to claim 1, wherein the setting device sets the ratio for each priority given to data to be transmitted.

6. The radio base station apparatus according to claim 1, further comprising a notification device configured to notify information showing the second period to the responder.

7. The radio base station apparatus according to claim 6, further comprising a device configured to transmit the first frame to the responder by using the transmission opportunity, wherein
the first frame is an aggregation frame, and
the notification device notifies the information showing the second period to the responder by describing the information to a sub-frame to be added to a head of the aggregation frame to be transmitted firstly in the transmission opportunity period.

8. The radio base station apparatus according to claim 1, wherein the setting device sets the ratio for each one of a plurality of radio terminal apparatuses.

9. The radio base station apparatus according to claim 1, wherein the setting device sets the ratio for each one of a plurality of radio terminal apparatuses and also for each priority given to data to be transmitted from the radio terminal apparatuses.

10. The radio base station apparatus according to claim 9, wherein the setting device sets the ratio in addition to setting of the traffic streams by including the ratio into parameters for the setting of the traffic streams when the traffic streams, regarding data with a higher priority, are set to the radio terminal apparatuses.

11. The radio base station apparatus according to claim 1, wherein the setting device sets the ratio on the basis of the number of traffic streams, regarding data with a higher priority, which are set for transmission directions from the radio base station apparatus to a plurality of radio terminal apparatuses and of the number of traffic streams, regarding data with a higher priority, which are set for transmission directions from the radio terminal apparatuses to the radio base station apparatus.

12. The radio base station apparatus according to claim 1, wherein the setting device sets the ratio on the basis of a total of a required amount of band assignment requests of traffic streams, regarding data with a higher priority, which are set for one-way transmission directions from the radio base station apparatus to a plurality of radio terminal apparatuses and of a total of a required amount of band assignment requests of traffic streams, regarding data with a higher priority, set for one-way transmission directions from the radio terminal apparatuses to the radio base station apparatus.

13. The radio base station apparatus according to claim 12, wherein the setting device sets the ratio also on the basis of a total of a required amount of band assignment requests of traffic streams, regarding data with a higher priority, which are set for bi-directional transmission directions between the radio base station apparatus and the radio terminal apparatuses.

14. The radio base station apparatus according to claim 1 wherein the setting device sets a ratio between the transmission amount of the data of the higher order layers and the transmission amount of the transmission acknowledgement frames, as the ratio when transmission directions of traffic streams, regarding the data with the higher priority, which are set are those of the traffic streams to be used in communications among radio terminal apparatuses.

15. The radio base station apparatus according to claim 1, further comprising a memory to store the transmission data, wherein the memory has an area which is divided into a first area to store data regarding the transmission acknowledgement frames of the higher order layers and a second area to store other data.

16. A radio terminal apparatus used in a radio communication system in which an initiator holds a transmission opportunity (TXOP) period in a frame exchange sequence and a responder responds to the initiator in the frame exchange sequence, comprising:
a reception device configured to receive, from a radio base station apparatus, information showing a ratio between a first period necessary for transmitting a first frame from the initiator to the responder and a second period necessary for transmitting a second frame from the responder to the initiator; and
a calculation device configured to calculate the first period to be used by the initiator and the second period to be used by the responder, on the basis of the transmission opportunity period and of the ratio which is received, wherein
a setting device acquires a transmission amount of data that higher order layers transmit and a transmission amount of transmission acknowledgement frames for the data transmitted by the higher order layers and sets the ratio between the transmission amount of data of the higher order layers and the transmission amount of the transmission acknowledgement frames for the data transmitted by the higher order layers, when communication of the data is performed in accordance with a communication method by which two protocols are used for transmissions of the higher order layers and lower order layers, the transmission acknowledgement frames in the higher order layers are provided for the data transmissions of the higher order layers and the transmission acknowledgement frames of the higher order layers become the transmission data of the lower order layers.

17. A radio communication system comprising a radio base station apparatus and a plurality of radio terminal apparatuses, in which an initiator holds a transmission opportunity (TXOP) period in a frame exchange sequence and a responder responds to the initiator in the frame exchange sequence, the radio base station apparatus including:
a setting device configured to set a ratio between a first period necessary for transmitting a first frame from the initiator to the responder and a second period necessary for transmitting a second frame from the responder to the initiator; and a transmission device configured to transmit information showing the set ratio to the plurality of radio terminal apparatuses, and the radio terminal apparatuses each including:

a reception device configured to receive the information from the radio base station apparatus; and a calculation device configured to calculate the first period to be used by the initiator and the second period to be used by the responder, on the basis of the acquired communication period and of the ratio which is received, wherein the setting device acquires a transmission amount of data that higher order layers transmit and a transmission amount of transmission acknowledgement frames for the data transmitted by the higher order layers and sets a ratio between the transmission amount of data of the higher order layers and the transmission amount of the transmission acknowledgement frames for the data transmitted by the higher order layers, when communication of the data is performed in accordance with a communication method by which two protocols are used for transmissions of the higher order layers and lower order layers, the transmission acknowledgement frames in the higher order layers are provided for the data transmissions of the higher order layers and the transmission acknowledgement frames of the higher order layers become the transmission data of the lower order layers.

18. A band assignment method in a radio base station apparatus used in a radio communication system in which an initiator holds a transmission opportunity (TXOP) period in a frame exchange sequence and a responder responds to the initiator in the frame exchange sequence, the method comprising:

setting a ratio between a first period necessary for transmitting a first frame from the initiator to the responder and a second period necessary for transmitting a second frame from the responder to the initiator; and calculating the first period to be used by the initiator and the second period to be used by the responder, on the basis of the transmission opportunity period and of the ratio which is set, wherein the setting includes acquiring a transmission amount of data that higher order layers transmit and a transmission amount of transmission acknowledgement frames for the data transmitted by the higher order layers and setting a ratio between the transmission amount of data of the higher order layers and the transmission amount of the transmission acknowledgement frames for the data transmitted by the higher order layers, when communication of the data is performed in accordance with a communication method by which two protocols are used for transmissions of the higher order layers and lower order layers, the transmission acknowledgement frames in the higher order layers are provided for the data transmissions of the higher order layers and the transmission acknowledgement frames of the higher order layers become the transmission data of the lower order layers.

19. A band assignment method in a radio base station apparatus used in a radio communication system in which an initiator holds a transmission opportunity (TXOP) period in a frame exchange sequence and a responder responds to the initiator in the frame exchange sequence, the method comprising:

acquiring a transmission amount of data that higher order layers transmit and a transmission amount of transmission acknowledgement frames for the data transmitted by the higher order layers and setting a ratio between the transmission amount of data of the higher order layers and the transmission amount of the transmission acknowledgement frames for the data transmitted by the higher order layers, when communication of the data is performed in accordance with a communication method by which two protocols are used for transmissions of the higher order layers and lower order layers, the transmission acknowledgement frames in the higher order layers are provided for the data transmissions of the higher order layers and the transmission acknowledgement frames of the higher order layers become the transmission data of the lower order layers;

receiving, from a radio base station apparatus, information showing the ratio between a first period necessary for transmitting a first frame from the initiator to the responder and a second period necessary for transmitting a second frame from the responder to the initiator; and calculating the first period to be used by the initiator and the second period to be used by the responder, on the basis of the transmission opportunity period and of the ratio which is received.

20. A radio terminal apparatus used in a radio communication system in which an initiator holds a transmission opportunity (TXOP) period in a frame exchange sequence and a responder responds to the initiator in the frame exchange sequence, comprising:

a reception device configured to receive, from a radio base station apparatus, information showing a ratio between a first period necessary for transmitting a first frame from the initiator to the responder and a second period necessary for transmitting a second frame from the responder to the initiator; and a calculation device configured to calculate the first period to be used by the initiator and the second period to be used by the responder, on the basis of the transmission opportunity period and of the ratio which is received, wherein the ratio is set on the basis of:

a total of a required amount of band assignment requests of traffic streams, regarding data with a higher priority, which are set for one-way transmission directions from the radio base station apparatus to a plurality of radio terminal apparatuses;

a total of a required amount of band assignment requests of traffic streams, regarding data with a higher priority, set for one-way transmission directions from the radio terminal apparatuses to the radio base station apparatus; and a total of a required amount of band assignment requests of traffic streams, regarding data with a higher priority, which are set for bi-directional transmission directions between the radio base station apparatus and the radio terminal apparatuses.

21. A radio communication system comprising a radio base station apparatus and a plurality of radio terminal apparatuses, in which an initiator holds a transmission opportunity (TXOP) period in a frame exchange sequence and a responder responds to the initiator in the frame exchange sequence, the radio base station apparatus including:

a setting device configured to set a ratio between a first period necessary for transmitting a first frame from the initiator to the responder and a second period necessary for transmitting a second frame from the responder to the initiator; and a transmission device configured to transmit information showing the set ratio to the plurality of radio terminal apparatuses, and the radio terminal apparatuses each including:

a reception device configured to receive the information from the radio base station apparatus; and a calculation device configured to calculate the first period to be used by the initiator and the second period to be used by the responder, on the basis of the acquired communication period and of the ratio which is received, wherein the ratio is set on the basis of:

a total of a required amount of band assignment requests of traffic streams, regarding data with a higher priority, which are set for one-way transmission directions from the radio base station apparatus to a plurality of radio terminal apparatuses;

a total of a required amount of band assignment requests of traffic streams, regarding data with a higher priority, set for one-way transmission directions from the radio terminal apparatuses to the radio base station apparatus; and a total of a required amount of band assignment requests of traffic streams, regarding data with a higher priority, which are set for bi-directional transmission directions between the radio base station apparatus and the radio terminal apparatuses.

22. A band assignment method in a radio base station apparatus used in a radio communication system in which an initiator holds a transmission opportunity (TXOP) period in a frame exchange sequence and a responder responds to the initiator in the frame exchange sequence, the method comprising:

setting a ratio between a first period necessary for transmitting a first frame from the initiator to the responder and a second period necessary for transmitting a second frame from the responder to the initiator; and calculating the first period to be used by the initiator and the second period to be used by the responder, on the basis of the transmission opportunity period and of the ratio which is set, wherein the ratio is set on the basis of:

a total of a required amount of band assignment requests of traffic streams, regarding data with a higher priority, which are set for one-way transmission directions from the radio base station apparatus to a plurality of radio terminal apparatuses;

a total of a required amount of band assignment requests of traffic streams, regarding data with a higher priority, set for one-way transmission directions from the radio terminal apparatuses to the radio base station apparatus; and a total of a required amount of band assignment requests of traffic streams, regarding data with a higher priority, which are set for bi-directional transmission directions between the radio base station apparatus and the radio terminal apparatuses.

23. A band assignment method in a radio base station apparatus used in a radio communication system in which an initiator holds a transmission opportunity (TXOP) period in a frame exchange sequence and a responder responds to the initiator in the frame exchange sequence, the method comprising:

receiving, from a radio base station apparatus, information showing a ratio between a first period necessary for transmitting a first frame from the initiator to the responder and a second period necessary for transmitting a second frame from the responder to the initiator; and calculating the first period to be used by the initiator and the second period to be used by the responder, on the basis of the transmission opportunity period and of the ratio which is received, wherein the ratio is set on the basis of:

a total of a required amount of band assignment requests of traffic streams, regarding data with a higher priority, which are set for one-way transmission directions from the radio base station apparatus to a plurality of radio terminal apparatuses;

a total of a required amount of band assignment requests of traffic streams, regarding data with a higher priority, set for one-way transmission directions from the radio terminal apparatuses to the radio base station apparatus; and a total of a required amount of band assignment requests of traffic streams, regarding data with a higher priority, which are set for bi-directional transmission directions between the radio base station apparatus and the radio terminal apparatuses.

* * * * *